United States Patent
Cho et al.

(10) Patent No.: US 12,236,116 B2
(45) Date of Patent: Feb. 25, 2025

(54) SYSTEMS AND METHODS FOR SELECTIVELY CONTROLLING PROGRAMMING OPERATIONS OF A MEMORY SYSTEM COMPRISING A PLURALITY OF SUPER BLOCKS

(71) Applicant: Samsung Electronics Co., Ltd., Suwon-si (KR)

(72) Inventors: Kyungjune Cho, Hwaseong-si (KR); Jongmin Kim, Seoul (KR); Minsik Oh, Gunpo-si (KR); Joohyeong Yoon, Seoul (KR); Keunhwan Lee, Anyang-si (KR); Youngjin Cho, Seoul (KR)

(73) Assignee: Samsung Electronics Co., Ltd. (KR)

( * ) Notice: Subject to any disclaimer, the term of this patent is extended or adjusted under 35 U.S.C. 154(b) by 55 days.

(21) Appl. No.: 17/868,147

(22) Filed: Jul. 19, 2022

(65) Prior Publication Data

US 2023/0185470 A1 Jun. 15, 2023

(30) Foreign Application Priority Data

Dec. 10, 2021 (KR) ........................ 10-2021-0176470

(51) Int. Cl.
*G06F 3/06* (2006.01)
(52) U.S. Cl.
CPC ............ *G06F 3/064* (2013.01); *G06F 3/0616* (2013.01); *G06F 3/0659* (2013.01); *G06F 3/0679* (2013.01)
(58) Field of Classification Search
CPC ............................... G06F 3/064; G06F 3/0659
See application file for complete search history.

(56) References Cited

U.S. PATENT DOCUMENTS

| 6,101,547 A * | 8/2000 | Mukherjee ......... H04N 21/2312 |
| | | 709/230 |
| 7,654,466 B2 | 2/2010 | Maeda et al. |
| 8,364,888 B2 | 1/2013 | Melik-Martirosian et al. |
| 8,645,617 B2 | 2/2014 | Shaeffer et al. |
| 9,286,212 B2 | 3/2016 | Miura |
| 9,652,379 B1 * | 5/2017 | Syu ..................... G06F 12/0246 |
| 2012/0198186 A1 | 8/2012 | Koshiyama et al. |
| 2019/0087128 A1 * | 3/2019 | Shin ..................... G06F 12/0246 |
| 2022/0283738 A1 * | 9/2022 | Su ........................ G06F 3/0652 |

FOREIGN PATENT DOCUMENTS

JP 2768618 B2 6/1998

* cited by examiner

*Primary Examiner* — David Yi
*Assistant Examiner* — Nicholas A. Paperno
(74) *Attorney, Agent, or Firm* — Myers Bigel, P.A.

(57) ABSTRACT

A memory system includes a memory controller and a memory device including a plurality of dies, each die including a plurality of blocks. A plurality of commands are configured to control the memory device in units of super blocks. During a first time interval, a first erase operation is performed on a first-first block among the first-first block to a first-Mth block, and a first program operation is performed on a second-first block to a second-Mth block, based on the first commands. During a second time interval, a second erase operation is performed on a first-second block among the first-first block to the first-Mth block, and a second program operation is performed on the first-first block and one or more blocks among the second-first block to the second-Mth block, based on the second commands.

20 Claims, 17 Drawing Sheets

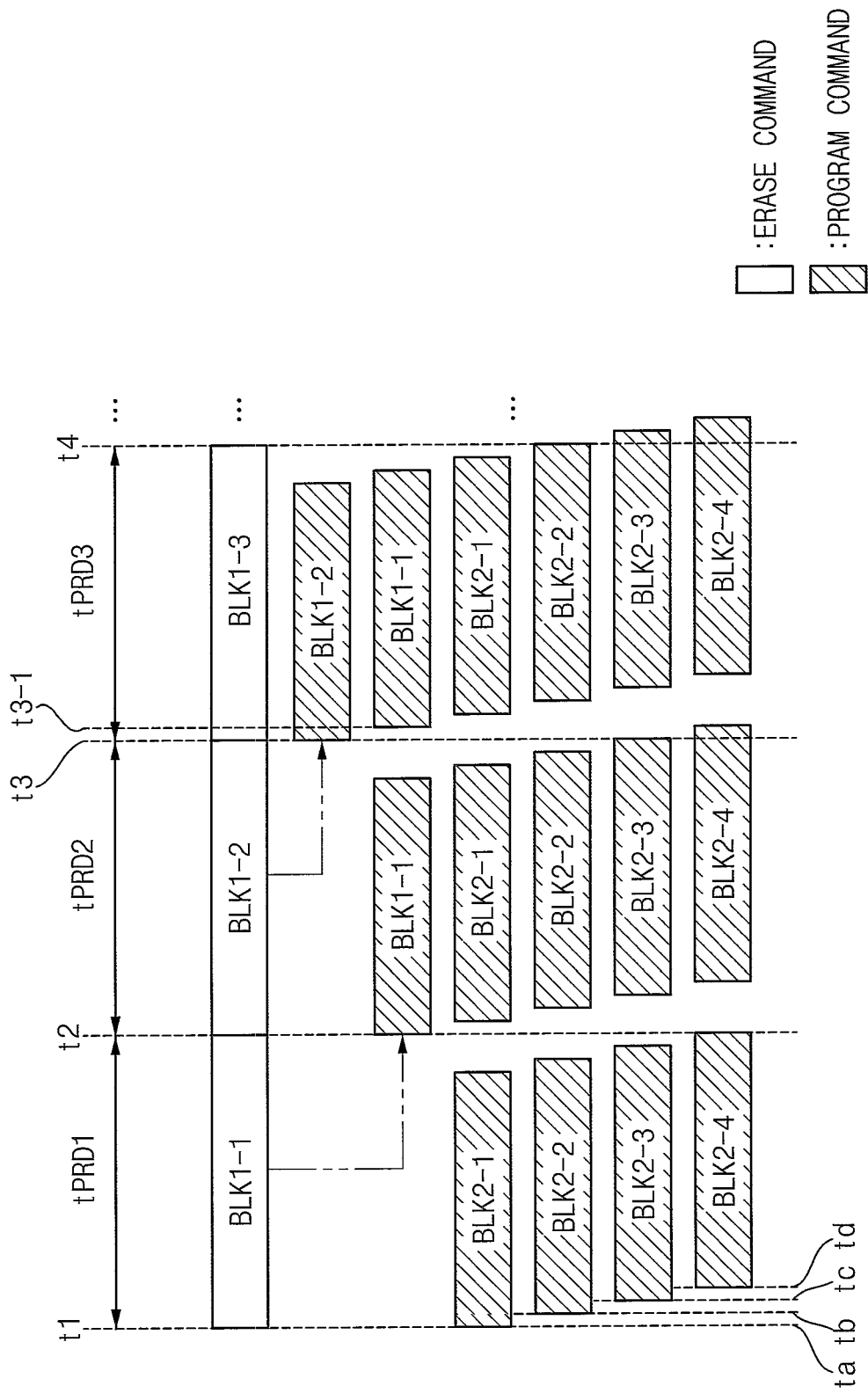

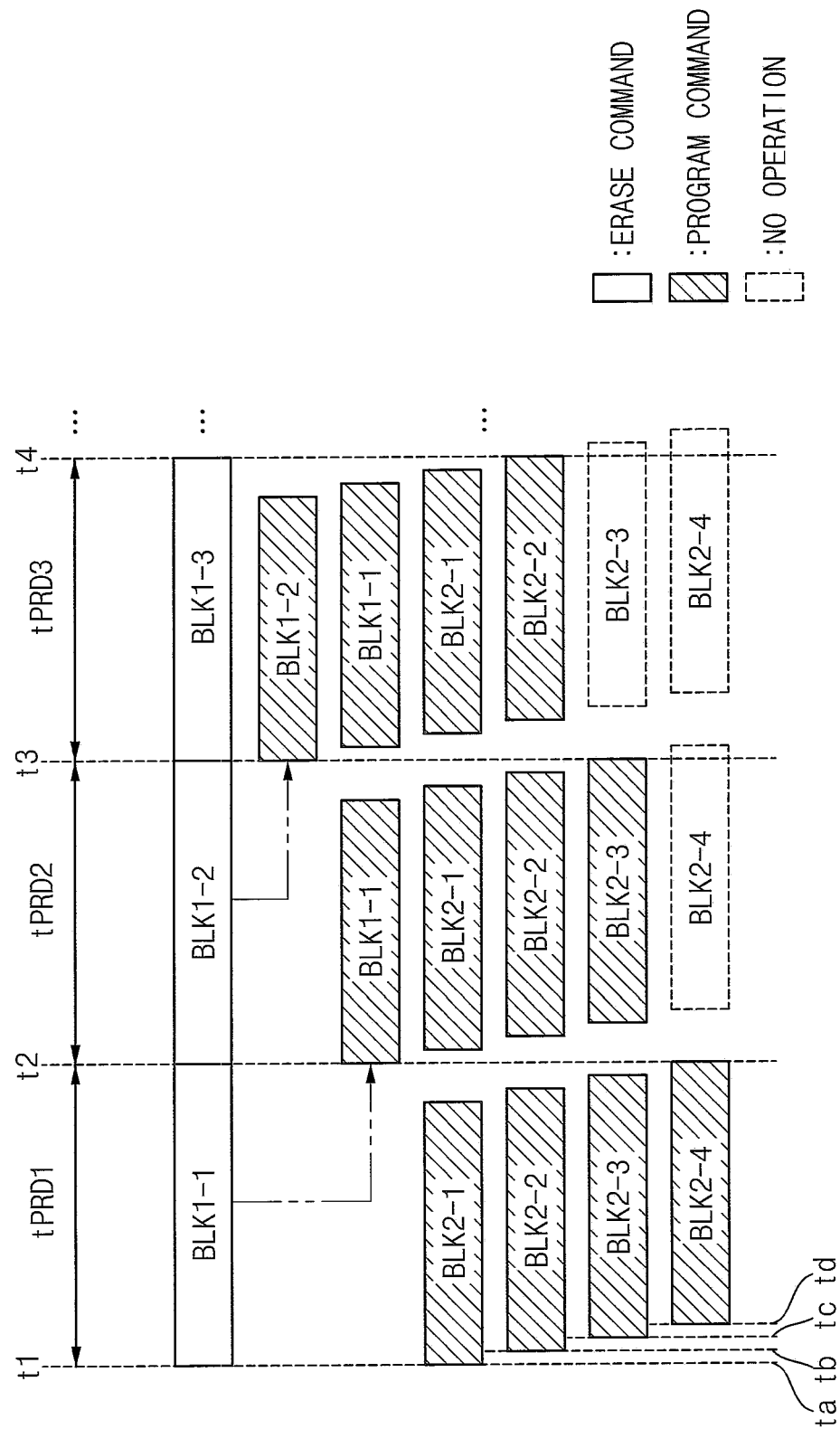

SYSTEMS AND METHODS FOR SELECTIVELY CONTROLLING PROGRAMMING OPERATIONS OF A MEMORY SYSTEM COMPRISING A PLURALITY OF SUPER BLOCKS

CROSS-REFERENCE TO RELATED APPLICATION

This U.S. non-provisional application claims priority under 35 USC § 119 to Korean Patent Application No. 10-2021-0176470, filed on Dec. 10, 2021, in the Korean Intellectual Property Office (KIPO), the disclosure of which is incorporated by reference herein in its entirety.

FIELD

Example embodiments relate generally to semiconductor integrated circuits, and more particularly to a method of operating a memory system and a memory system performing the method.

BACKGROUND

Memory devices such as a solid state drives (SSDs) using nonvolatile memories may be widely used. Such memory devices may offer advantages of excellent stability and durability, fast information access speed, and/or low power consumption, but may have a limited number of program-erase (PE) cycles. The memory devices include a plurality of memory cells, and each memory cell may have one of a program state and an erase state. In the erase state, holes may be accumulated in a floating gate of a memory cell. However, the holes may diffuse around over time, and the diffused holes may combine with electrons stored in memory cells having the program state to distort a threshold voltage distribution of the memory cells having the program state. Thus, the memory cell having the erase state should be programmed within a predetermined time after being erased. This constraint may be referred to as an erase-to-program interval (EPI) constraint of the memory device.

SUMMARY

Some example embodiments may provide a method and an apparatus for a memory system, capable of performing a program operation without delay due to a completion of an erase operation.

According to example embodiments, a method of operating a memory system includes operations executed by at least one of a memory controller and a memory device. The memory device includes a plurality of dies. Each of the plurality of dies includes a plurality of blocks. A plurality of commands are output based on a program request and program data. The plurality of commands include first and second commands configured to control the memory device in units of super blocks. The super blocks include blocks included in different dies among the plurality of dies. During a first time interval, a first erase operation is performed on a first-first block among a first-first block to a first-Mth block of the blocks included in a first super block among the super blocks based on the first commands, where M is an integer greater than or equal to two. During the first time interval, a first program operation is performed on a second-first block to a second-Mth block of the blocks included in a second super block among the super blocks based on the first commands. During a second time interval after the first time interval, a second erase operation is performed on a first-second block among the first-first block to the first-Mth block based on the second commands. During the second time interval, a second program operation is performed on the first-first block and one or more blocks among the second-first block to the second-Mth block based on the second commands.

According to example embodiments, a memory system includes a memory device and a memory controller. The memory device includes a plurality of dies each of which includes a plurality of blocks. The memory controller is configured to control the memory device. The memory controller is configured to output a plurality of commands including first and second commands based on a program request and program data. The plurality of commands are configured to control the memory device in units of super blocks. The super blocks include blocks included in different dies of the plurality of dies. During a first time interval, the memory device is configured to perform, based on the first commands, a first erase operation on first-first block among the first-first block to a first-Mth block of the blocks included in a first super block among the super blocks, where M is an integer greater than or equal to two. During the first time interval, the memory device is configured to perform, based on the first commands, a first program operation on a second-first block to a second-Mth block of the blocks included in a second super block among the super blocks. During a second time interval after the first time interval, the memory device is configured to perform, based on the second commands, a second erase operation on the first-second block among the first-first block to the first-Mth block. During the second time interval, the memory device is configured to perform, based on the second commands, a second program operation on the first-first block and one or more blocks among the second-first block to the second-Mth block.

BRIEF DESCRIPTION OF THE DRAWINGS

Example embodiments of the present disclosure will be more clearly understood from the following detailed description taken in conjunction with the accompanying drawings.

FIGS. 12A, 12B and 12C are timing diagrams illustrating operations of a memory device in FIG. 2.

FIG. 14 is a timing diagram illustrating operations of the memory device in FIG. 2.

DETAILED DESCRIPTION OF EMBODIMENTS

Figure 1:
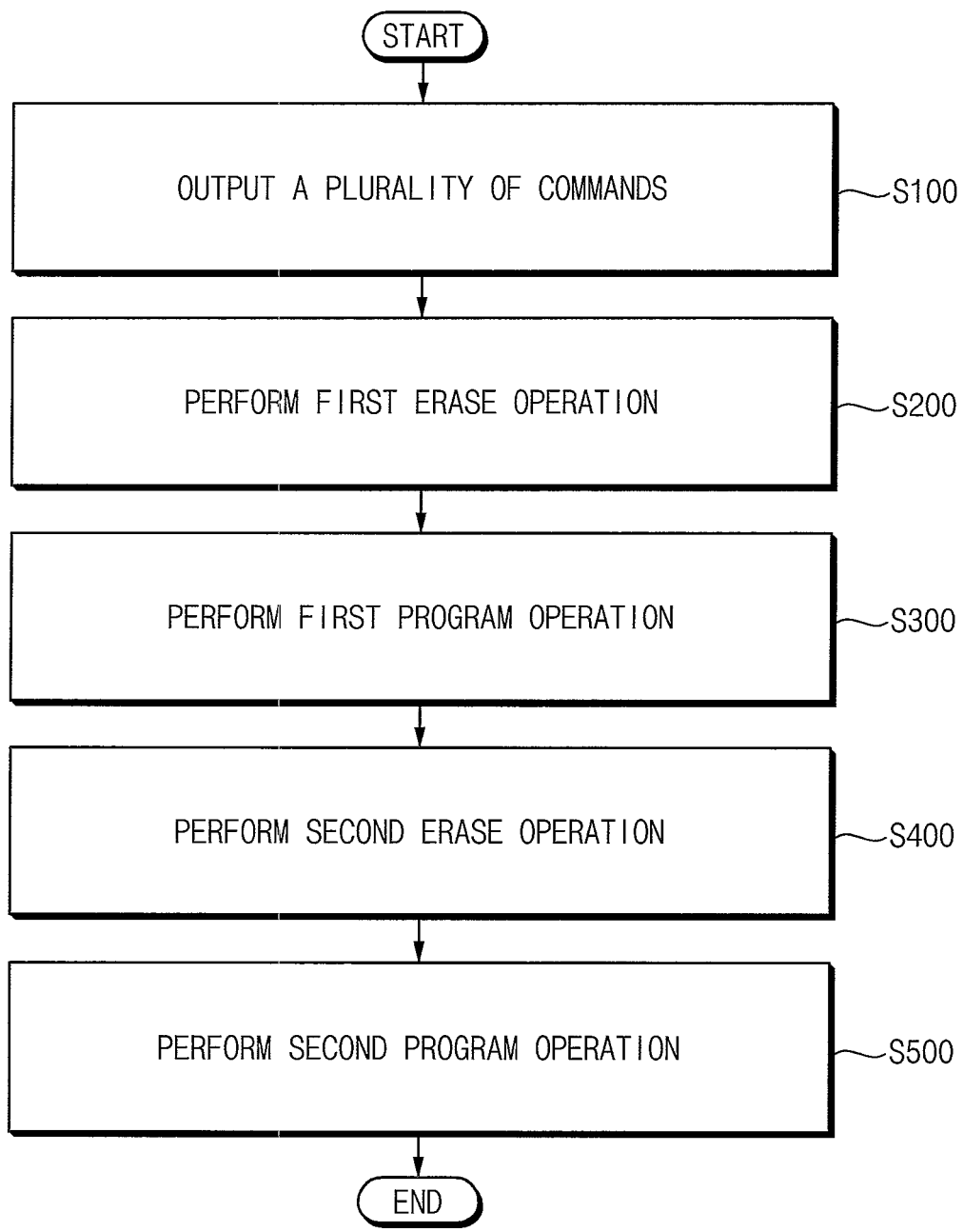
FIG. 1 is a flowchart illustrating a method of operating a memory system according to example embodiments.

Various example embodiments will be described more fully hereinafter with reference to the accompanying drawings, in which some example embodiments are shown. In the drawings, like numerals refer to like elements throughout. The repeated descriptions may be omitted.

FIG. 1 is a flowchart illustrating a method of operating a memory system according to example embodiments.

Referring to FIG. 1, a memory system may include a memory controller and a memory device. In some embodiments, the memory device may be a nonvolatile memory device, and may include a plurality of dies, and each of the plurality of dies may include a plurality of blocks.

In a method of operating a memory system according to example embodiments, a plurality of commands may be output based on a program request and program data (S100). The plurality of commands may be for controlling the memory device in units of super blocks. The super blocks may include blocks included in different dies.

In some embodiments, S100 may be performed by the memory controller and the commands may be received by the memory device. The program request may be one of requests issued by an external host device. The program request may be provided from or fetched from the host device, and the program data may correspond to the program request and may be data provided from the host device to be programmed in the memory device.

In some embodiments, a super block may be a unit for the memory controller to control the memory device. For example, the memory device may include a plurality of planes, each of the plurality of planes may include a plurality of blocks, and each of the plurality of blocks may include a plurality of pages. In this case, the super block may be a group of blocks included in different dies. The super block will be described below with reference to FIG. 3.

In some embodiments, the plurality of commands may include program commands and erase commands, and the program commands and the erase commands may be generated based on the program request. In this case, the program commands may be commands for programming the program data in a predetermined storage region of the memory device, and the erase command may be commands for erasing a predetermined storage region of the memory device before programming the program data in the memory device.

In some embodiments, the plurality of commands may be generated based on program scheduling information. The program scheduling information may represent time intervals or storage regions of the memory device required to program the program data in the memory device. For example, the program scheduling information may represent blocks to be grouped in the super blocks among the plurality of blocks, and represent time points at which the plurality of commands are issued to the memory device. The program scheduling information will be described below with reference to FIG. 6. The terms first, second, third, etc. may be used herein merely to distinguish one element or operation from another.

During a first time interval, a first erase operation on a first-first block among the first-first block to a first-Mth block (i.e., a one of a first set of 1 to M blocks) included in a first super block may be performed based on first commands, where M is an integer greater than or equal to two (S200). During the first time interval, a first program operation on a second-first block to a second-Mth block (i.e., ones of a second set of 1 to M blocks) included in a second super block may be performed based on the first commands (S300).

During a second time interval after the first time interval, a second erase operation on a first-second block among the first-first block to the first-Mth block (i.e., another or next one of the first set of 1 to M blocks) may be performed based on second commands (S400). During the second time interval, a second program operation on the first-first block and one or more blocks among the second-first block to the second-Mth block (i.e., the one of the first set and ones of the second set of 1 to M blocks) may be performed based on the second commands (S500).

In some embodiments, S200, S300, S400 and S500 may be performed by the memory device.

In some embodiments, a plurality of time intervals and a plurality of super blocks may be determined based on the program scheduling information. For example, the plurality of time intervals may include the first time interval and the second time interval, and the plurality of super blocks may include the first super block and the second super block.

In some embodiments, the plurality of time intervals may be sufficient time intervals for the program data to be programmed in the plurality of super blocks. The plurality of time intervals may include the first time interval to Zth time interval, where Z is an integer greater than or equal to two. For convenience of description, when the second time interval is referred to as a 'present time interval', the first time interval may be referred to as a 'previous time interval' and the third time interval may be referred to as a 'next time interval'.

In some embodiments, blocks grouped in the first super block, the second super block, etc., in each of the plurality of time intervals may be different from each other. For example, during the first time interval, the first-first block to the first-Mth block may be grouped in the first super block, and the second-first block to the second-Mth block may be grouped in the second super block. During the second time interval, the first-second block to the first-Mth block may be grouped in the first super block, and the first-first block and one or more blocks among the second-first block to the second-Mth block may be grouped in the second super block. For example, a portion of blocks included in the first super block corresponding to the first time interval may be removed from or otherwise not included in the first super block corresponding to the second time interval, and the removed block may be added to the second super block corresponding to the second time interval.

In some embodiments, an erase operation may be performed on blocks included in the first super block during the plurality of time intervals sequentially, the blocks on which the erase operation has been performed may be grouped in the second super block in next time interval that follows the erase operation, and during the next time interval, a program operation may be performed on blocks on which the erase operation has been performed. For example, each of the plurality of time intervals may be a time interval required to perform the erase operation on one of blocks included in the first super block. An erase operation may be performed on one of blocks included in the first super block during the first time interval, and an erase operation may be performed on another one of blocks included in the first super block during the second time interval after the first time interval.

In some embodiments, the plurality of commands may include the first commands and the second commands. The first commands may be commands provided from the memory controller to the memory device during the first time interval, and the second commands may be commands provided from the memory controller to the memory device during the second time interval.

In some embodiments, the first super block may include invalid blocks.

In some embodiments, the second commands may be provided to blocks included in the second super block sequentially.

In the method of operation the memory system according to example embodiments including the above configurations, an erase operation on blocks included in the first super block and a program operation on blocks included in the second super block may be simultaneously performed in parallel in each of the plurality of time intervals. The program operation corresponding to the program request or the program command may be efficiently performed without delay due to the completion of the erase operation. The blocks on which the erase operation has been performed may be grouped in the second super block in a next time period that follows the erase operation, and during the next time interval, a program operation may be performed on blocks on which the erase operation has been performed. Thus, it is possible to avoid an erase-to-program interval (EPI) constraint that a memory cell on which the erase operation has been performed must be programmed within a predetermined time after being erased.

A plurality of blocks included in the memory device may be grouped in various schemes to form super blocks. As will be described below, time intervals or storage regions of the memory device required to program the program data in the memory device may be adjusted in various schemes based on a change in configurations of the super blocks.

Figure 2:
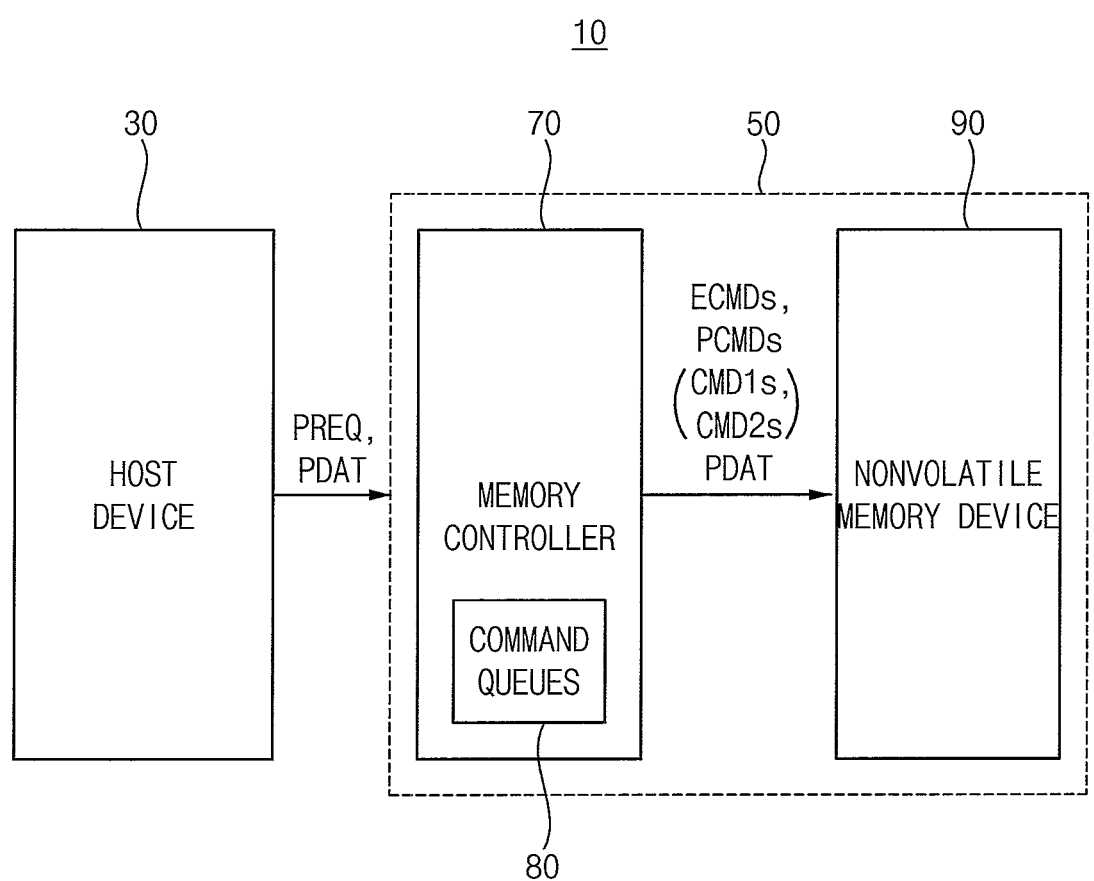
FIG. 2 a block diagram illustrating an electronic system including a memory system according to example embodiments.

FIG. 2 a block diagram illustrating an electronic system including a memory system according to example embodiments.

Referring to FIG. 2, an electronic system 10 may include a host device 30 and a memory system 50. The host device 30 may control overall operations of the electronic system 10.

In some embodiments, the host device 30 may include a host processor and a host memory. The host processor may control operations of the host device 30. For example, the host processor may execute an operating system (OS). The host memory may store instructions and data executed and processed by the host processor. For example, the OS executed by the host processor may include a file system for file management and a device driver for controlling peripheral devices including the memory system 50 at the OS level.

The memory system 50 may include a memory controller 70 and a memory device 90, and the memory controller 70 may include command queues 80. In some embodiments, the memory device 90 may be a nonvolatile memory device, and may include a plurality of dies, and each of the plurality of dies may include a plurality of blocks.

The memory controller 70 may control operations of the memory device 90. For example, the memory controller 70 may control operations of the memory device 90 based on requests and data received from the host device 30. The memory device 90 may include a plurality of nonvolatile memories, and the plurality of nonvolatile memories may store data.

In one embodiment, each of the plurality of nonvolatile memories may include a NAND flash memory. In another embodiment, each of the plurality of nonvolatile memories may include an electrically erasable programmable read-only memory (EEPROM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like.

In some embodiments, the memory system 50 may further include a buffer memory. The buffer memory may store commands and data executed and processed by the memory controller 70, and may temporarily store data programmed or to be programmed in the plurality of nonvolatile memories. For example, the buffer memory may include a volatile memory such as a dynamic random access memory (DRAM).

The memory system 50 may receive a program request PREQ and program data PDAT corresponding to the program request PREQ from the host device 30. In some embodiments, the program request PREQ may be provided from or fetched from the host device 30.

The memory controller 70 may temporarily store a plurality of commands ECMDs, PCMDs in a plurality of command queues 80 to control the memory device 90 in units of super blocks including blocks included in different dies, output the plurality of commands ECMDs, PCMDs to the memory device 90 at predetermined time points, and transmit the program data PDAT to the memory device 90.

In some embodiments, the plurality of commands ECMDs, PCMDs may include a plurality of erase commands ECMDs and a plurality of program commands PCMDs, and the plurality of commands ECMDs, PCMDs may include first commands CMD1s and second commands CMD2s corresponding to a plurality of time intervals.

During a first time interval, the memory device 90 may perform, based on the first commands CMD1s, a first erase operation on a first-first block among the first-first block to a first-Mth block included in a first super block, where M is an integer greater than or equal to two. During the first time interval, the memory device 90 may perform, based on the first commands CMD1s, a first program operation on a second-first block to a second-Mth block included in a second super block.

During a second time interval after the first time interval, the memory device 90 may perform, based on second commands CMD2s, a second erase operation on the first-second block among the first-first block to the first-Mth block. During the second time interval, the memory device 90 may perform, based on the second commands CMD2s, a second program operation on the first-first block and one or more blocks among the second-first block to the second-Mth block.

In one embodiment, the memory system 50 may be a solid state drive (SSD). In another embodiment, the memory system 50 may be a universal flash storage (UFS), a multimedia card (MMC) or an embedded MMC (eMMC). In another embodiment, the memory system 50 may be a secure digital (SD) card, a micro SD card, a memory stick, a chip card, a universal serial bus (USB) card, a smart card or a compact flash (CF) card.

In some embodiments, the memory system 50 may be connected to the host device 30 through a block accessible interface including a nonvolatile memory express (NVMe) bus, and the memory system 50 may be accessed in units of blocks through the block accessible interface.

In one embodiment, the electronic system 10 may be any computing system, such as a personal computer (PC), a server computer, a data center, a workstation, a digital television, a set-top box, etc. In another embodiment, the electronic system 10 may be any mobile system, such as a mobile phone, a smart phone, a tablet PC, a laptop computer, a personal digital assistant (PDA), a portable multimedia player (PMP), a portable game console, a music player, a video player, a navigation device, a wearable device, an internet of things (IoT) device, an e-book, a virtual reality (VR) device, an augmented reality (AR) device, a drone, etc.

Figure 3:
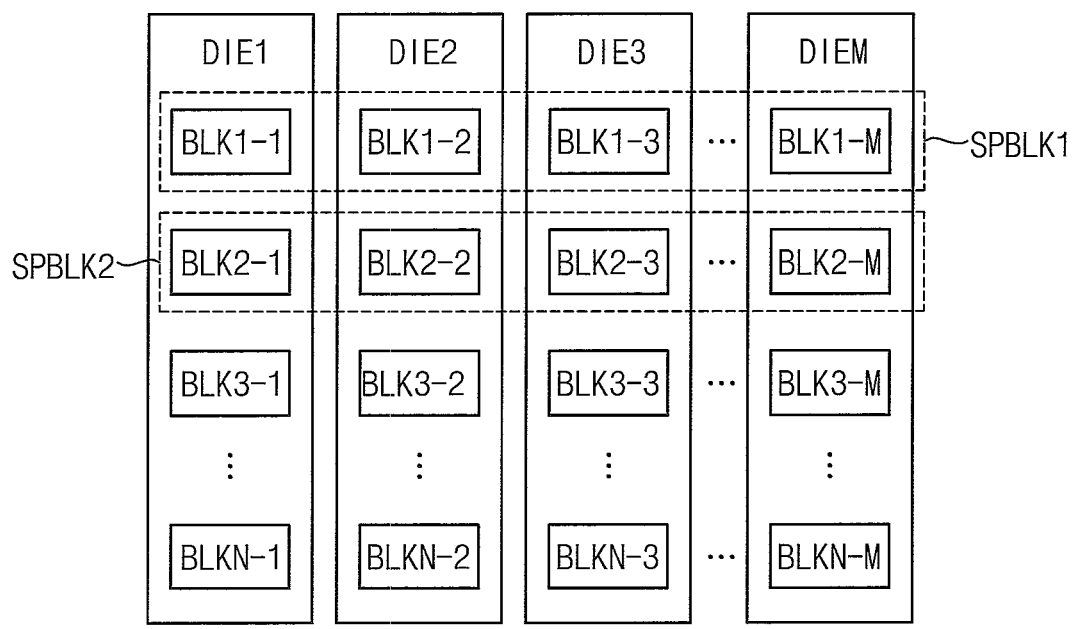
FIG. 3 is a diagram illustrating a super block in FIG. 1.

FIG. 3 is a diagram illustrating a super block in FIG. 1.

In FIG. 3, a plurality of dies DIE1, DIE2, DIE3, . . . , DIEM are illustrated. The plurality of dies DIE1, DIE2, DIE3, . . . , DIEM may be included in the memory device 90 described above with reference to FIG. 2.

Referring to FIG. 3, a first die DIE1 among the plurality of dies DIE1, DIE2, DIE3, . . . , DIEM may include a plurality of blocks BLK1-1, BLK2-1, BLK3-1, . . . , BLKN-1, where N is an integer greater than or equal to two, a second die DIE2 may include a plurality of blocks BLK1-2, BLK2-2, BLK3-2, . . . , BLKN-2, a third die DIE3 may include a plurality of blocks BLK1-3, BLK2-3, BLK3-3, . . . , BLKN-3, and a Mth die DIEM may include a plurality of blocks BLK1-M, BLK2-M, BLK3-M, . . . , BLKN-M. In some embodiments, each of the plurality of dies DIE1, DIE2, DIE3, . . . , DIEM may share the same channel, and a plurality of blocks, e.g., BLK1-1 to BLKN-1, included in one die, e.g., DIE1, may be accessed by the same way. However, a configuration of the plurality of dies DIE1, DIE2, DIE3, . . . , DIEM and the plurality of blocks BLK1-1 to BLKN-1, BLK1-2 to BLKN-2, BLK1-3 to BLKN-3, . . . , BLK1-M to BLKN-M included in the plurality of dies may be variously changed.

As described above with reference to FIGS. 1 and 2, the program data PDAT may be programmed in the memory device 90 during a plurality of time intervals based on the program request PREQ, and the memory controller 70 may control blocks included in the memory device 90 in units of super blocks to program the program data PDAT in the memory device 90.

In some embodiments, blocks BLK1-1, BLK1-2, BLK1-3, . . . , BLK1-M included in different dies DIE1, DIE2, DIE3, . . . , DIEM may be grouped in a first super block SPBLK1, and blocks BLK2-1, BLK2-2, BLK2-3, . . . , BLK2-M included in different dies DIE1, DIE2, DIE3, . . . , DIEM may be grouped in a second super block SPBLK2. However, the number and a range of blocks included in each of the first super block SPBLK1 and the second super block SPBLK2 may be variously changed.

In some embodiments, blocks to be grouped in the first super block SPBLK1 and the second super block SPBLK2 in each of the plurality of time intervals may be different from each other. For example, during a first time interval, blocks BLK1-1, BLK1-2, BLK1-3, . . . , BLK1-M may be grouped in the first super block SPBLK1, and blocks BLK2-1, BLK2-2, BLK2-3, . . . , BLK2-M may be grouped in the second super block SPBLK2. During a second time interval after the first time interval, blocks BLK1-2, BLK1-3, . . . , BLK1-M may be grouped in the first super block SPBLK1, and blocks BLK1-1, BLK2-1, BLK2-2, BLK2-3, . . . , BLK2-M may be grouped in the second super block SPBLK2. During a third time interval after the second time interval, blocks BLK1-3, . . . , BLK1-M may be grouped in the first super block SPBLK1, and blocks BLK1-1, BLK1-2, BLK2-1, BLK2-2, BLK2-3, . . . , BLK2-M may be grouped in the second super block SPBLK2.

Figure 4:
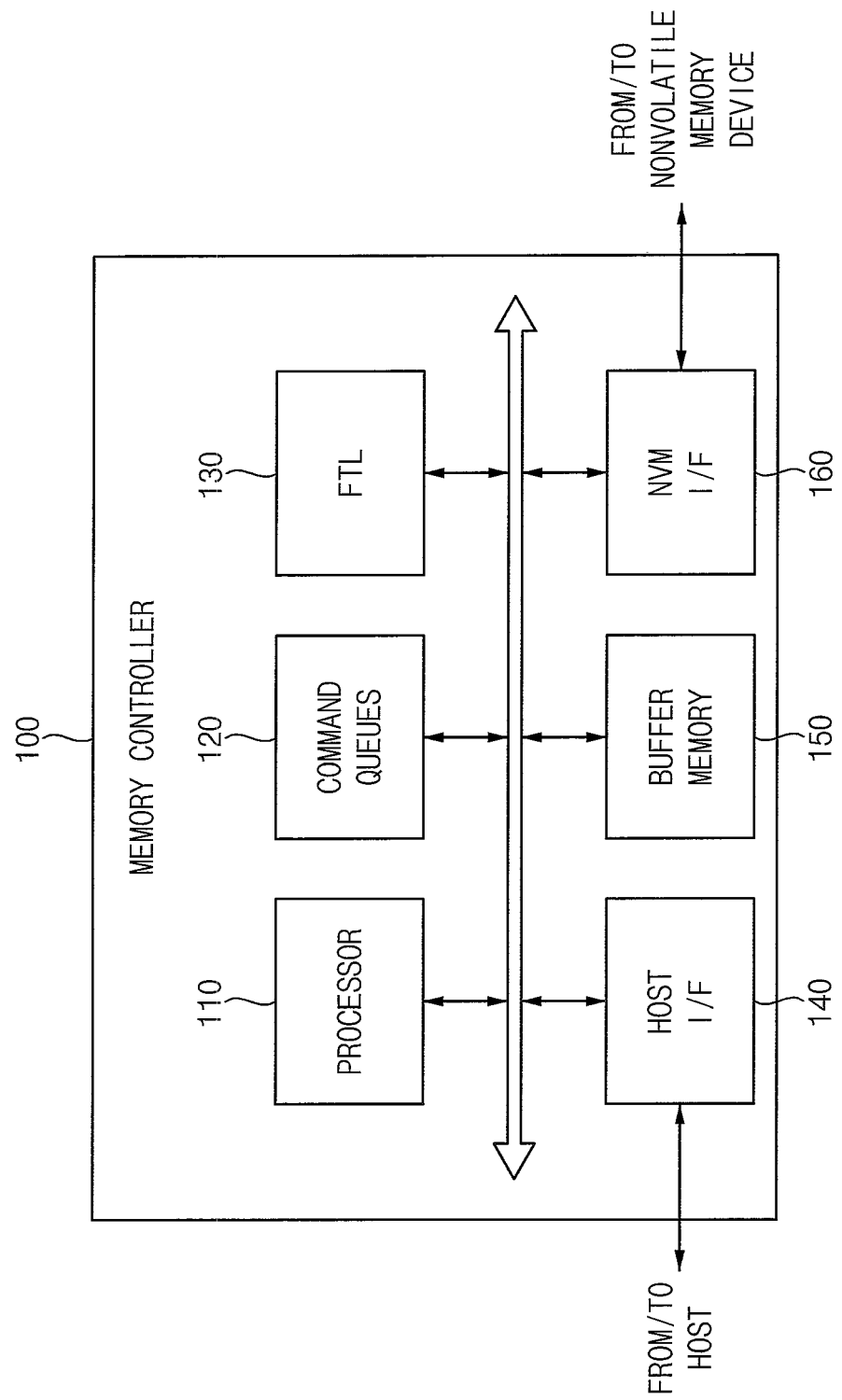
FIG. 4 is a block diagram illustrating an example embodiment of memory controller in FIG. 2.

FIG. 4 is a block diagram illustrating an example embodiment of memory controller in FIG. 2.

Referring to FIG. 4, the memory controller 100 may include a processor 110, command queues 120, a flash translation layer (FTL) 130, a host interface 140, a buffer memory 150 and a memory interface 160.

The processor 110 may control operations of the memory controller 100 based on requests and data received from a host device, e.g., 30 in FIG. 2, through the host interface 140. For example, the processor 110 may employ firmware for driving a memory device, e.g., 90 in FIG. 2, to control the operations of the memory controller 100. For example, when the processor 110 receives a program request and program data corresponding to the program request from the host device, the processor 100 may generate, based on the program request and the program data, a plurality of commands to control the memory device in units of super blocks including blocks included in different dies. The processor 110 may temporarily store the plurality of commands in the command queues 120, and control the command queues 120 to output the plurality of commands to the memory device at a predetermined time points.

The processor 110 may further receive the requests and data addresses corresponding to the requests, and the FTL 130 may convert logical data addresses, e.g., logical block addresses (LBAs), received from the host device, to physical data addresses, e.g., physical block addresses (PBAs) using address mapping information.

The host interface 140 may provide a physical connection between the host device and the memory device. For example, the host interface 140 may provide an interfacing with the storage device corresponding to a bus format of the host device. In some embodiments, a bus format of the host device may be peripheral component interconnect express (PCIe), NVMe, or the like.

The memory interface 160 may exchange data with nonvolatile memories included in the memory device. The memory interface 160 may transmit data to the nonvolatile memories and receive data retrieved from the nonvolatile memories. In one embodiment, the memory interface 160 may be connected to the nonvolatile memories through one channel. In another embodiment, the memory interface 160 may be connected to the nonvolatile memories through two or more channels.

Although not illustrated in FIG. 4, the memory controller 100 may further include an advance encryption engine (AES) engine and an error correction code (ECC) block. The AES engine may perform an encryption and a decryption of data using an AES algorithm, and may further include separate encryption and decryption modules. The ECC block may perform an ECC encoding and an ECC decoding using a coded modulation, such as a Bose-Chaudhuri-Hocquenghem (BCH) code, a low density parity check code, a turbo code, a Reed-Solomon code, a convolution code, a recursive systematic code, a trellis-coded modulation, a block coded modulation, etc., or other error correction codes.

Figure 5:
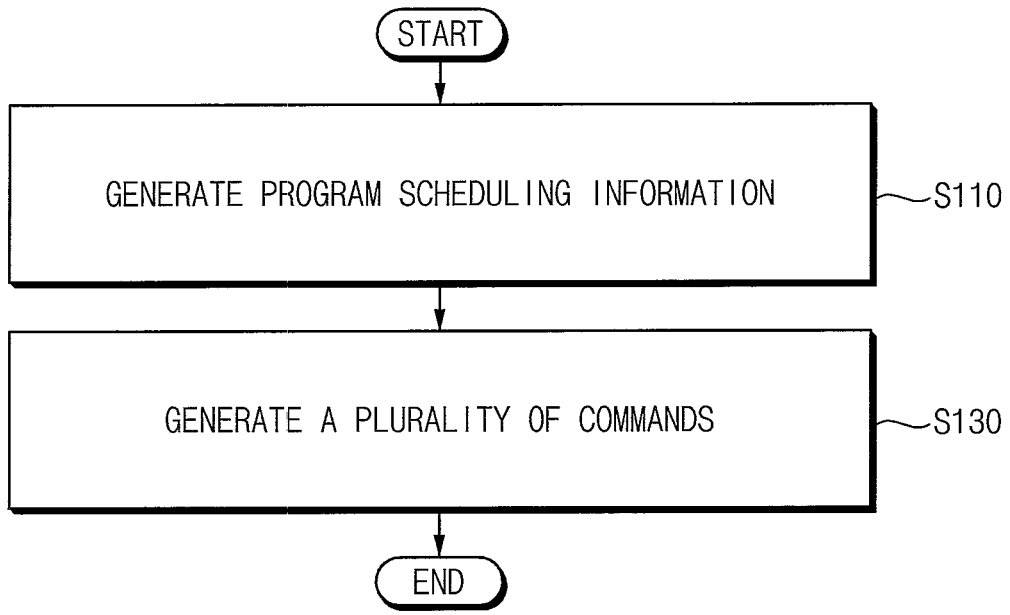
FIG. 5 is a flowchart illustrating an example of outputting a plurality of commands in FIG. 1.

FIG. 5 is a flowchart illustrating an example of outputting a plurality of commands in FIG. 1.

Referring to FIGS. 1 and 5, in the outputting the plurality of commands, program scheduling information may be generated (S110).

In some embodiments, the program scheduling information may represent blocks to be grouped in the first super block and the second super block in each of the plurality of time intervals such that the program data is programmed in a predetermined super block during the plurality of time intervals. For example, the program scheduling information may represent blocks to be grouped in the first super block and the second super block in each of the first time interval and the second time interval.

A plurality of commands may be generated based on the program scheduling information (S130).

In some embodiments, as described above with reference to FIGS. 1 and 2, the plurality of commands may be temporarily stored in a plurality of command queues, and output to a memory device at predetermined time points.

In some embodiments, the program scheduling information may represent a time point at which each of first commands and second commands is issued to a memory device. For example, the first commands may be provided with respect to blocks included in the first super block sequentially, and the second commands may be provided with respect to blocks included in the second super block sequentially.

Figure 6:
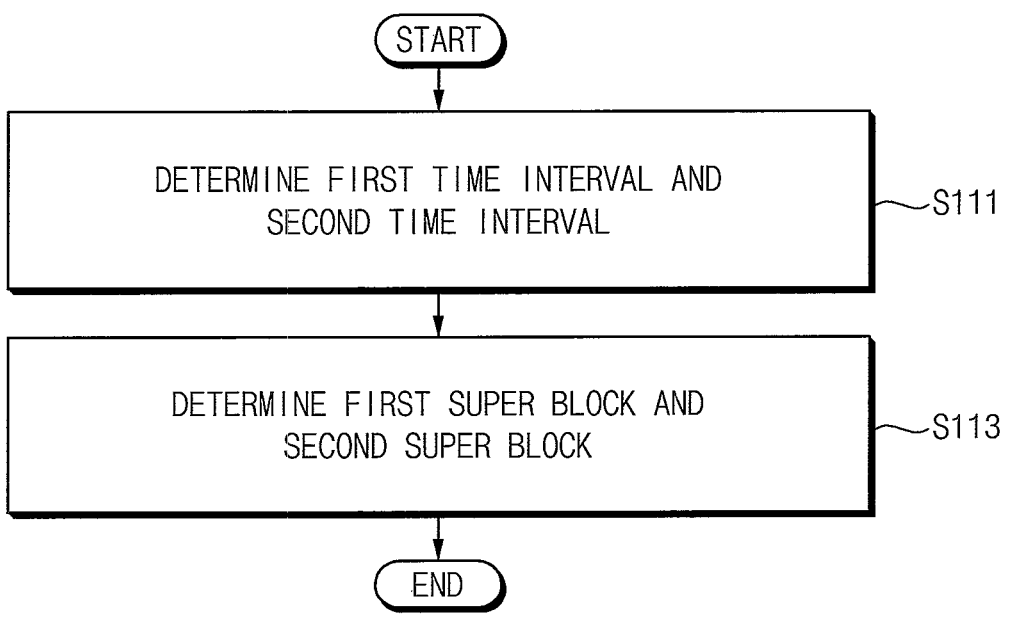
FIG. 6 is a flowchart illustrating an example of generating program scheduling information in FIG. 5.

FIG. 6 is a flowchart illustrating an example of generating program scheduling information in FIG. 5.

Referring to FIGS. 5 and 6, in the generating the program scheduling information, the first time interval and the second time interval may be determined (S111).

In some embodiments, the first time interval and the second time interval may be determined based on a size of program data and a number or quantity of bits of first data that is stored in each of a plurality of memory cells included in the plurality of blocks. When each of the plurality of memory cells corresponds to a single-level cell (SLC), the number of bits of the first data may be one, and when each of the plurality of memory cells corresponds to a multi-level cell (MLC), the number of bits of the first data may be two or greater than two. For example, the first time interval and the second time interval may be determined to be longer as the size of the program data increases and the number of bits of the first data increases, however, the first time interval and the second time interval may be determined in various schemes.

The first super block and the second super block may be determined (S113).

In some embodiments, the first super block and the second super block may be determined based on the size of the program data, the number of bits of the first data, and the first time interval and the second time interval. For example, as the size of the program data increases, the number of blocks included in each of the first super block and the second super block may decrease. For example, as the number of bits of the first data decreases, the number of blocks included in each of the first super block and the second super block may decrease. For example, as the first time interval and the second time interval decreases, the number of blocks included in each of the first super block and the second super block may decrease.

In some embodiments, by performing S111 and S113, the first time interval, the second time interval, the first super block and the second super block may be determined. In one embodiment, the first time interval and the second time interval are determined first, and then the first super block and the second super block may be determined as illustrated in FIG. 6, however, in another embodiment, the first super block and the second super block are determined first, and then the first time interval and the second time interval may be determined.

Figure 7A:
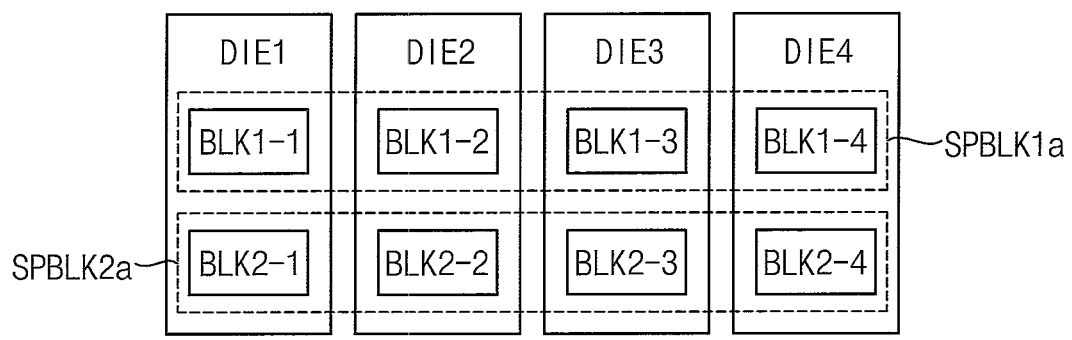
FIGS. 7A, 7B and 7C are diagrams illustrating examples of super blocks corresponding to a plurality of time intervals including a first time interval, a second time interval and a third time interval in FIG. 6.
Figure 7B:
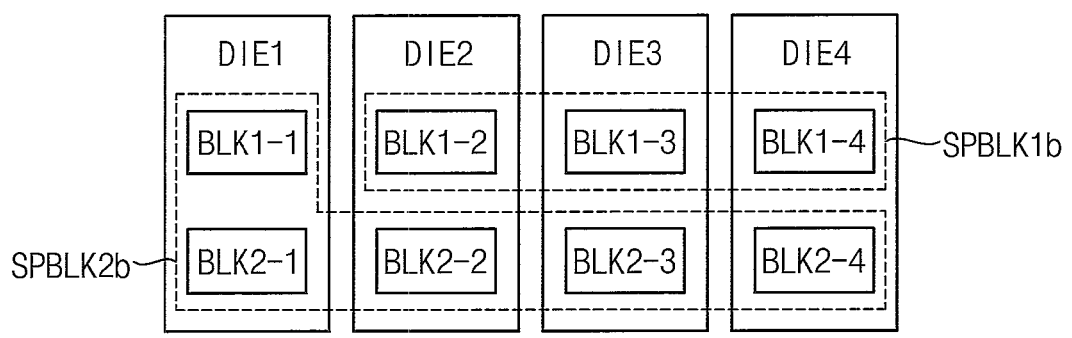
Figure 7C:
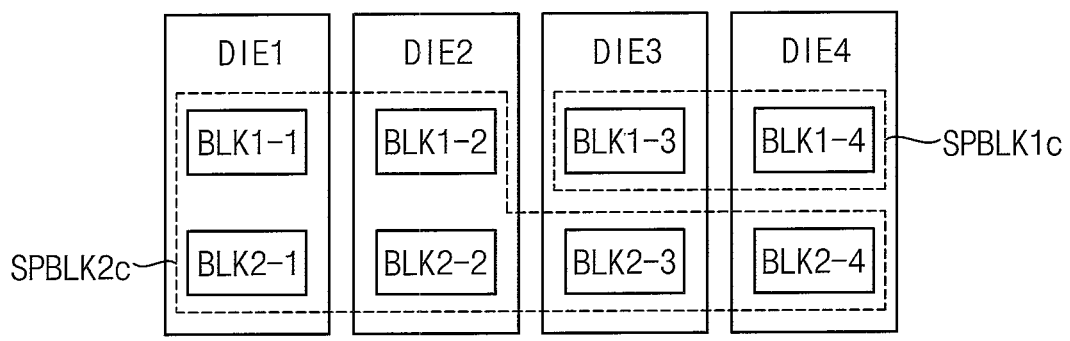

FIGS. 7A, 7B and 7C are diagrams illustrating examples of super blocks corresponding to a plurality of time intervals including a first time interval, a second time interval and a third time interval in FIG. 6.

In FIGS. 7A, 7B and 7C, a plurality of dies DIE1, DIE2, DIE3 and DIE4 and a plurality of blocks BLK1-1, BLK2-1, BLK1-2, BLK2-2, BLK1-3, BLK2-3, BLK1-4 and BLK2-4 included in the plurality of dies DIE1, DIE2, DIE3 and DIE4 are illustrated.

The first die DIE1 may include blocks BLK1-1 and BLK2-1, the second die DIE2 may include blocks BLK1-2 and BLK2-2, the third die DIE3 may include block BLK1-3 and BLK2-3, and the fourth die DIE4 may include blocks BLK1-4 and BLK2-4.

In FIGS. 7A, 7B and 7C, for convenience of description, only a portion BLK1-1, BLK2-1, BLK1-2, BLK2-2, BLK1-3, BLK2-3, BLK1-4 and BLK2-4 of the plurality of blocks BLK1-1 to BLKN-1, BLK1-2 to BLKN-2, BLK1-3 to BLKN-3, . . . , BLK1-M to BLKN-M illustrated in FIG. 3 are illustrated.

In FIGS. 7A, 7B and 7C, the plurality of blocks BLK1-1, BLK2-1, BLK1-2, BLK2-2, BLK1-3, BLK2-3, BLK1-4 and BLK2-4 may be grouped in first super blocks SPBLK1$a$, SPBLK1$b$ and SPBLK1$c$ and second super blocks SPBLK2$a$, SPBLK2$b$ and SPBLK2$c$.

In some embodiments, the first super block SPBLK1$a$ and the second super block SPBLK2$a$ in FIG. 7A may correspond to a first time interval, the first super block SPBLK1$b$ and the second super block SPBLK2$b$ in FIG. 7B may correspond to a second time interval after the first time interval, and the first super block SPBLK1$c$ and the second super block SPBLK2$c$ in FIG. 7C may correspond to a third time interval after the second time interval.

In some embodiments, blocks BLK1-1, BLK1-2, BLK1-3 and BLK1-4 may be grouped in the first super block SPBLK1$a$ corresponding to the first time interval, and blocks BLK2-1, BLK2-2, BLK2-3 and BLK2-4 may be grouped in the second super block SPBLK2$a$ corresponding to the first time interval.

In some embodiments, one or more blocks, e.g., BLK1-1, may be removed from the blocks BLK1-1, BLK1-2, BLK1-3 and BLK1-4 included in the first super block SPBLK1$a$, the remaining blocks BLK1-2, BLK1-3 and BLK1-4 may be grouped in the first super block SPBLK1$b$ corresponding to the second time interval, and the removed block BLK1-1 and blocks BLK2-1, BLK2-2, BLK2-3 and BLK2-4 may be grouped in the second super block SPBLK2$b$ corresponding to the second time interval.

In some embodiments, one or more blocks, e.g., BLK1-2, may be removed from the blocks BLK1-2, BLK1-3 and BLK1-4 included in the first super block SPBLK1$b$, the remaining blocks BLK1-3 and BLK1-4 may be grouped in the first super block SPBLK1$c$ corresponding to the third time interval, and the removed block BLK1-2 and blocks BLK1-1, BLK2-1, BLK2-2, BLK2-3 and BLK2-4 may be grouped in the second super block SPBLK2$c$ corresponding to the third time interval.

Figure 8:
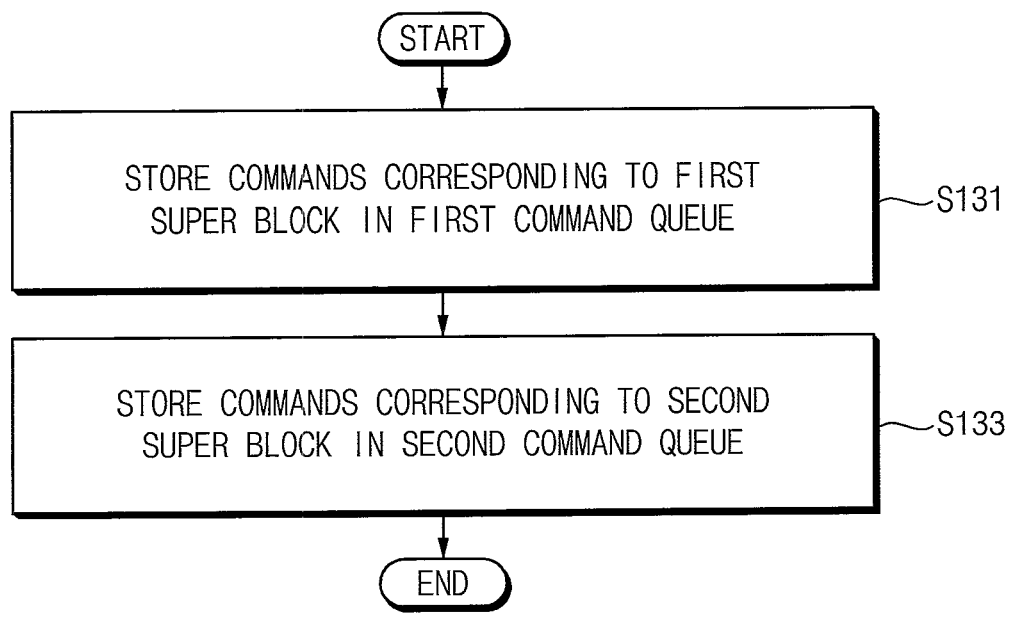
FIG. 8 is a flowchart illustrating an example of outputting the plurality of commands of FIG. 5.

FIG. 8 is a flowchart illustrating an example of outputting the plurality of commands of FIG. 5.

Referring to FIGS. 5 and 8, in the generating the plurality of commands, commands corresponding to the first super block among the plurality of commands may be stored in a first command queue among a plurality of command queues (S131). Commands corresponding to the second super block among the plurality of commands may be stored in a second command queue among the plurality of command queues (S133).

In some embodiments, the plurality of commands may be generated based on the program scheduling information. The plurality of commands may be generated in response to a program request provided from an external host device or fetched from the host device.

In some embodiments, the program scheduling information may represent a time point at which each of first commands and second commands is issued to a memory device.

In one embodiment, the number of the plurality of command queues may be the same as the number of super blocks for controlling a plurality of blocks included in the memory device. In another embodiment, the number of the plurality of command queues may be the same as the number of a plurality of dies included in the memory device. In another embodiment, the number of the plurality of command queues may increase in proportion to the number of the super blocks or the number of the plurality of dies.

Figure 9:
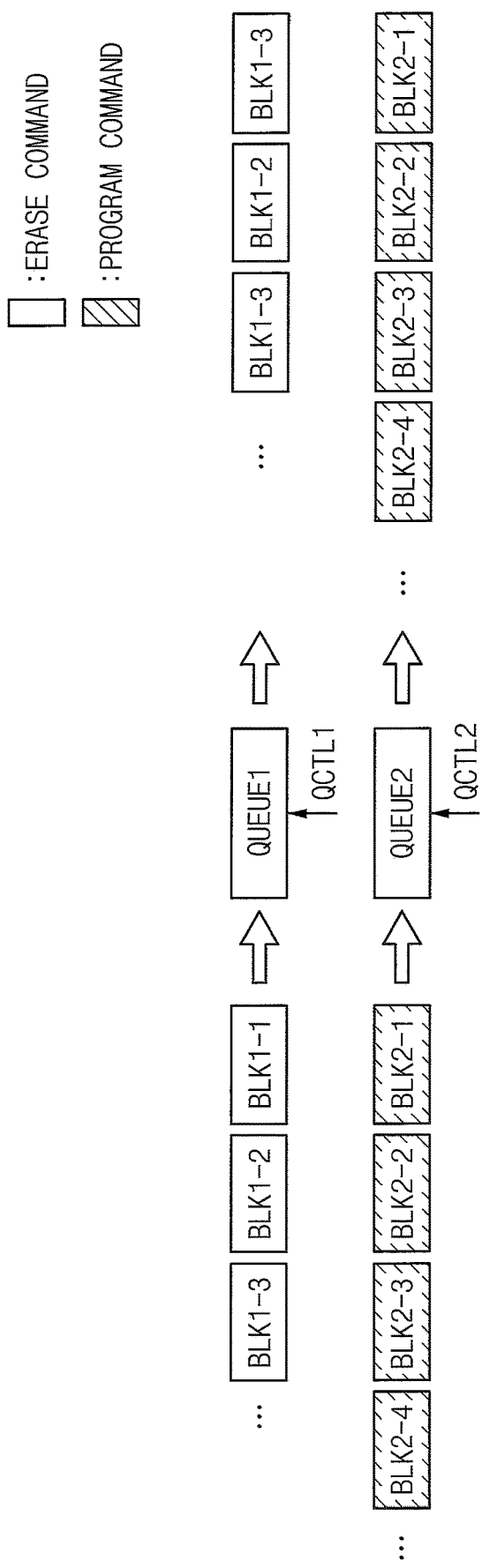
FIG. 9 is a diagram illustrating a plurality of command queues in FIG. 8.

FIG. 9 is a diagram illustrating a plurality of command queues in FIG. 8.

In FIG. 9, a first queue QUEUE1 and a second queue QUEUE2 are illustrated. The first queue and the second queue may correspond to the plurality of command queues in FIG. 8, and may correspond to the command queues 120 described above with reference to FIG. 4.

In some embodiments, the first queue may correspond to the first super blocks SPBLK1a, SPBLK1b and SPBLK1c, and the second queue may correspond to the second super blocks SPBLK2a, SPBLK2b and SPBLK2c, described above with reference to FIGS. 7A, 7B and 7C.

In some embodiments, the first queue may receive a control signal QCTL1 from a processor, e.g., 110 in FIG. 4, and the second queue may receive a control signal QCTL2 from the processor. The first queue and the second queue may output commands stored in the first queue and the second queue to a memory device, e.g., 90 in FIG. 2, at predetermined time points based on the control signals QCTL1 and QCTL2.

In some embodiments, the first queue may store a plurality of commands for controlling the first super blocks SPBLK1a, SPBLK1b and SPBLK1c, and the second queue may store a plurality of commands for controlling the second super blocks SPBLK2a, SPBLK2b and SPBLK2c. For example, the first queue may store erase commands, and the second queue may store program commands. Thus, an erase operation may be performed on blocks included in the first super blocks SPBLK1a, SPBLK1b and SPBLK1c, and a program operation may be performed on blocks included in the second super blocks SPBLK2a, SPBLK2b and SPBLK2c.

Figure 10:
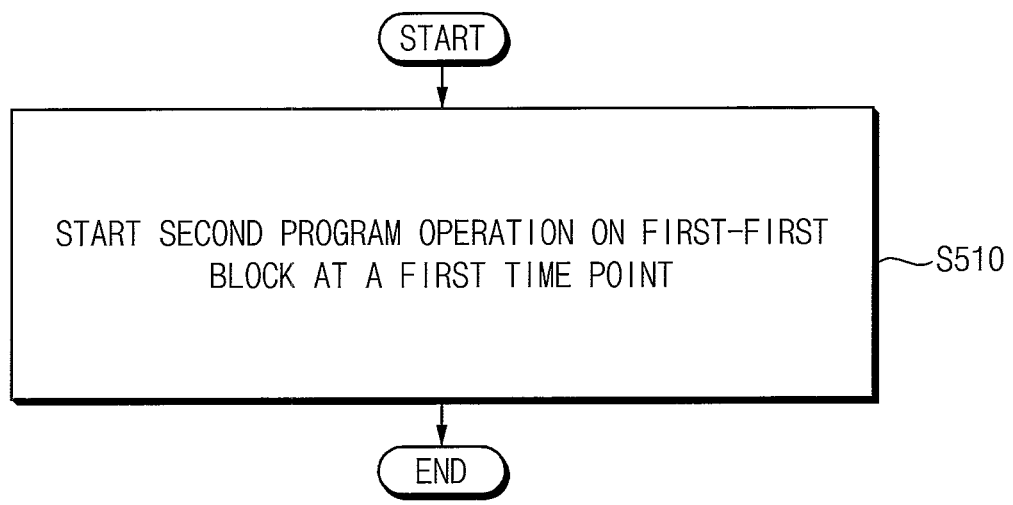
FIG. 10 is a flowchart illustrating an example of performing a second program operation in FIG. 1.

FIG. 10 is a flowchart illustrating an example of performing a second program operation in FIG. 1.

Referring to FIGS. 1 and 10, in the performing the second program operation, the second program operation on the first-first block may be started or initiated based on the second commands at a first time point at which a predetermined time has elapsed from a second time point (S510). The second time point may represent a time point at which the first erase operation on the first-first block is completed within the first time interval.

In some embodiments, the second program operation may be performed in parallel with the second erase operation. The second erase operation and the second program operation may be performed during the second time interval, and the second time interval may be a time interval required to perform the second erase operation. The second erase operation may be performed on one of blocks included in the first super block, and the second program operation may be performed on one or more blocks included in the second super block.

In some embodiments, in the second program operation, a program operation may be performed on the first-first block that was previously included in the first super block during the first time interval and on which an erase operation has been performed. The first-first block may include a plurality of memory cells, and the erase operation may be performed on the memory cells included in the first-first block during the first time interval. Holes may be accumulated in floating gates of the plurality of memory cells included in the first-first block and diffuse around as time goes by. Thus, the memory cells included in the first-first block may be programmed during the second time interval under the EPI constraint that must be programmed within a predetermined time from a time point at which the erase operation is performed. For example, the first-first block may be programmed immediately after performing the erase operation on the first-first block is completed. For example, the first-first block may be programmed at a time point at which a predetermined time has elapsed from a time point at which the erase operation on the first-first block is completed.

Figure 11:
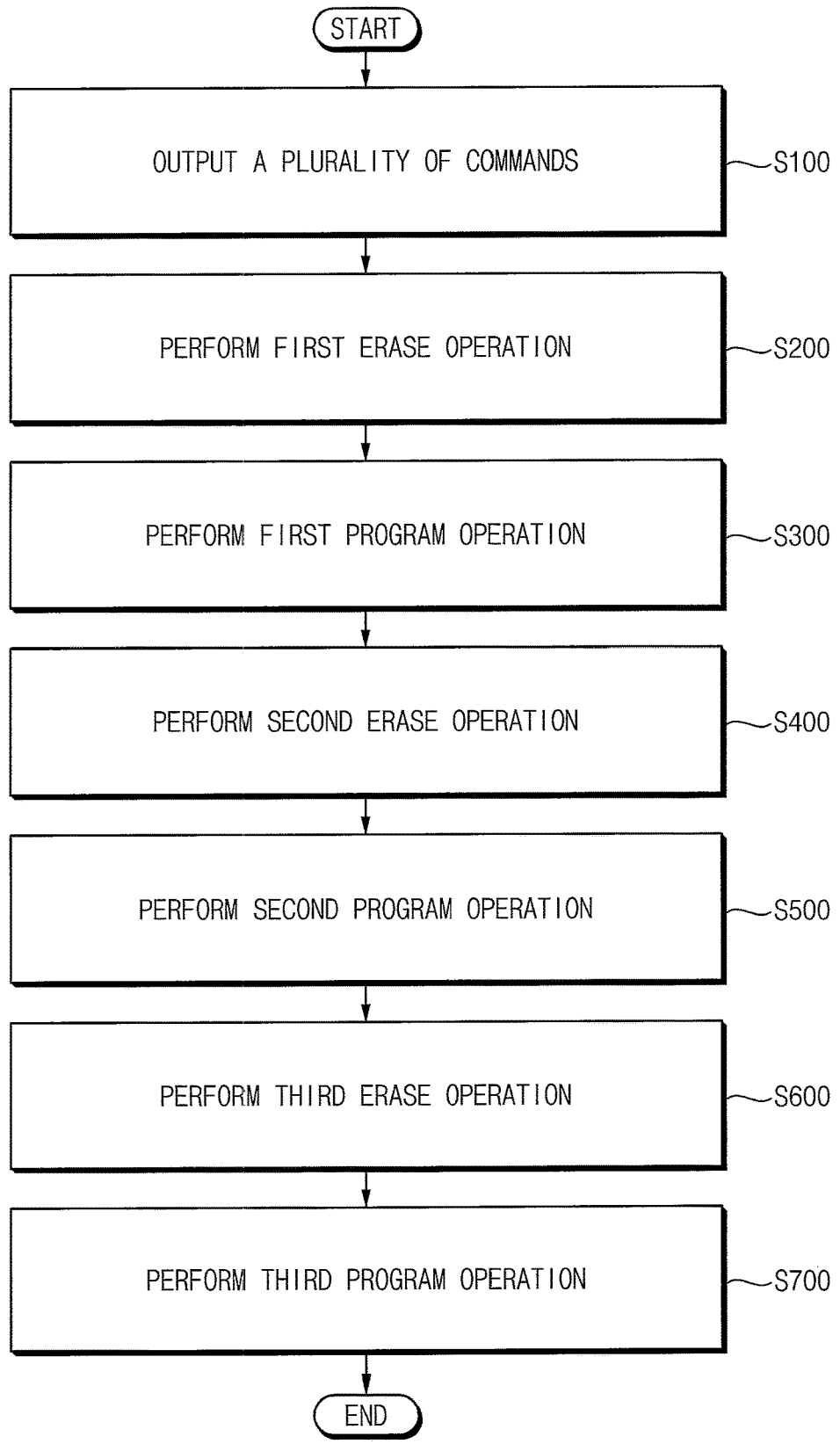
FIG. 11 is a flowchart illustrating a method of operating a memory system according to example embodiments.

FIG. 11 is a flowchart illustrating a method of operating a memory system according to example embodiments.

In a method of operating a memory system in FIG. 11, a third erase operation and a third program operation may be further performed compared to the method of operating the memory system in FIG. 1. Thus, duplicated descriptions will be omitted.

Referring to FIGS. 1 and 11, the memory system may include a memory controller and a memory device. In some embodiments, the memory device may be a nonvolatile memory device, and may include a plurality of dies, and each of the plurality of dies may include a plurality of blocks.

In the method of operating the memory system according to example embodiments, during a third time interval after the second time interval, a third erase operation on the first-third block among the first-first block to the first-Mth block may be performed based on third commands (S600). During the third time interval, a third program operation on the first-first block, the first-second block and one or more blocks among the second-first block to the second-Mth block may be performed based on the third commands (S700).

In some embodiments, S600 and S700 may be performed by the memory device.

In some embodiments, a plurality of time intervals and a plurality of super blocks may be determined based on the program scheduling information. For example, the plurality of time intervals may include the first time interval, the second time interval and the third time interval, and the plurality of super blocks may include the first super block and the second super block.

In some embodiments, blocks grouped in the first super block and the second super block in each of the plurality of time intervals may be different from each other. For example, during the first time interval, the first-first block to the first-Mth block may be grouped in the first super block, and the second-first block to the second-Mth block may be grouped in the second super block. During the second time interval, the first-second block to the first-Mth block may be grouped in the first super block, and the first-first block and one or more blocks among the second-first block to the second-Mth block may be grouped in the second super block. During the third time interval, the first-third block to the first-Mth block may be grouped in the first super block, and the first-first block, the first-second block and one or more blocks among the second-first block to the second-Mth block may be grouped in the second super block.

In some embodiments, an erase operation may be performed on blocks included in the first super block during the plurality of time intervals sequentially, the blocks on which the erase operation has been performed may be grouped in the second super block in next time interval that follow the erase operation, and during the next time interval, a program operation may be performed on blocks on which the erase operation has been performed. For example, each of the plurality of time intervals may be a time interval required to perform the erase operation on one of blocks included in the first super block. Thus, during the first time interval, an erase operation on one of blocks included in the first super block corresponding to the first time interval may be performed. During the second time interval after the first time interval, an erase operation on one of blocks included in the first super block corresponding to the second time interval may be performed. During the third time interval after the second time interval, an erase operation on one of blocks included in the first super block corresponding to the third time interval may be performed.

In one embodiment, an erase operation may be performed on one block included in the first super block, however, in another embodiment, an erase operation may be performed on one or more blocks included in the first super block. In this case, the one or more blocks on which the erase operation has been performed may be grouped in the second super block in a time interval after the erase operation, and a program operation may be performed on blocks grouped in the second super block.

Figure 12B:
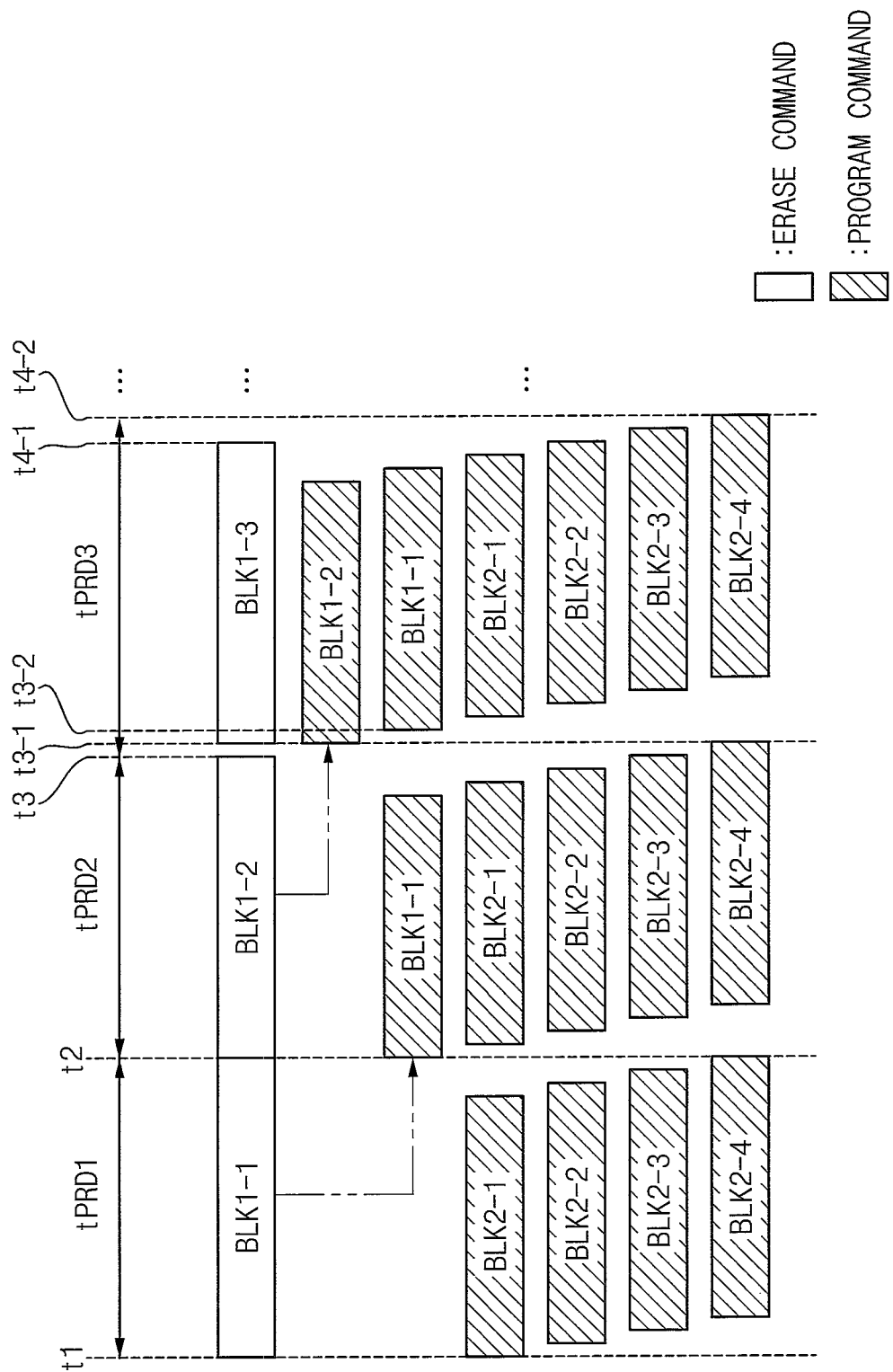
Figure 12C:
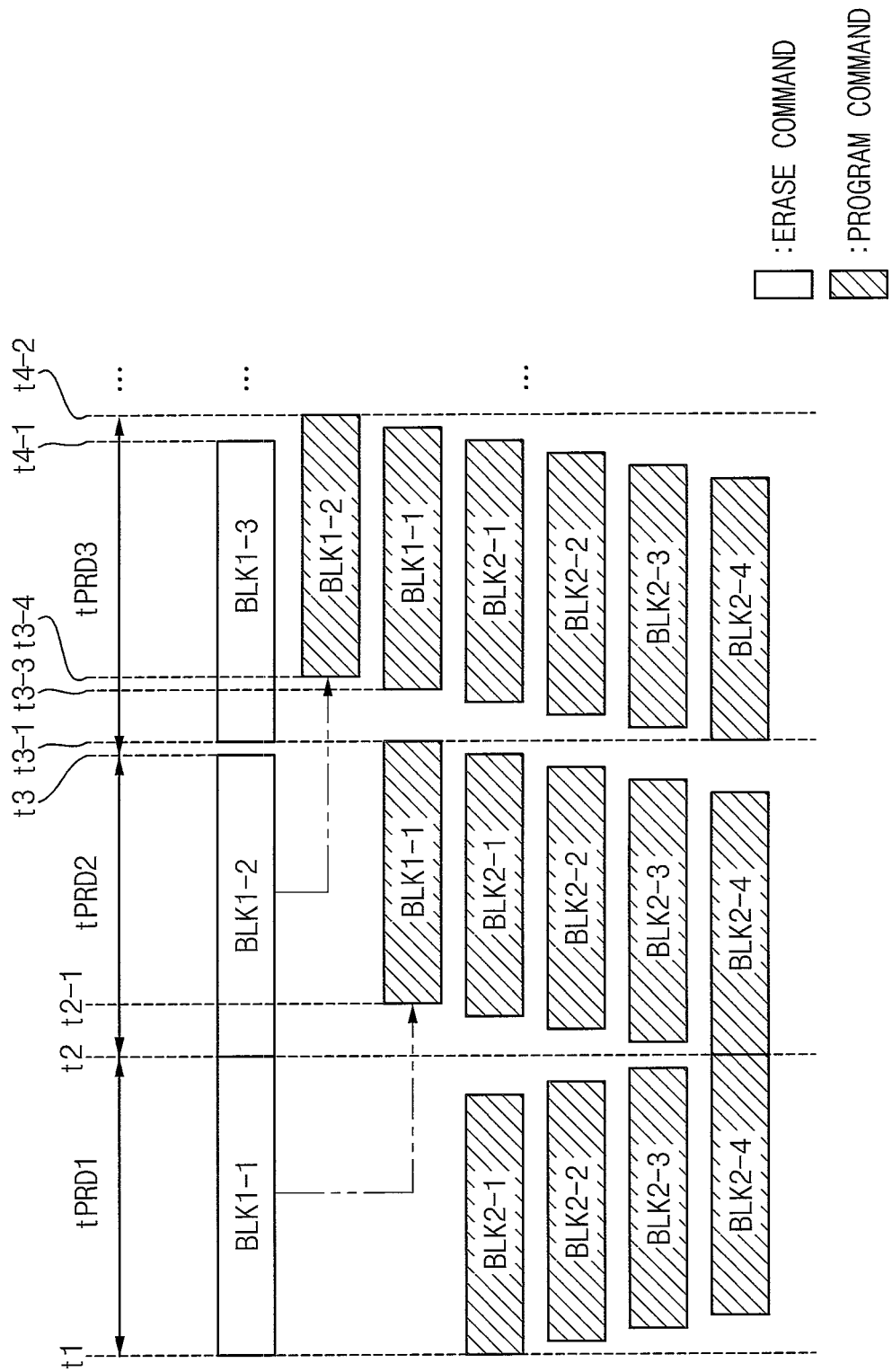

FIGS. 12A, 12B and 12C are timing diagrams illustrating operations of a memory device in FIG. 2.

Referring to FIGS. 12A, 12B and 12C, time points t1, t2, t3 and t4 and time intervals tPRD1, tPRD2, tPRD3 between the time points t1, t2, t3 and t4 are illustrated. The time interval tPRD1 may correspond to a first time interval, the time interval tPRD2 may correspond to a second time interval, and the time interval tPRD3 may correspond to a third time interval.

During the first time interval tPRD1, an erase operation may be performed on a block BLK1-1, and a program operation may be performed on blocks BLK2-1, BLK2-2, BLK2-3 and BLK2-4.

In some embodiments, the block BLK1-1 may be included in a first super block to perform the erase operation on the block BLK1-1, and the blocks BLK2-1, BLK2-2, BLK2-3 and BLK2-4 may be included in a second super block to perform the program operation on the blocks BLK2-1, BLK2-2, BLK2-3 and BLK2-4.

In some embodiments, a time point at which the program operation starts with respect to each of the blocks BLK2-1, BLK2-2, BLK2-3 and BLK2-4 may be different. For example, a program operation on block BLK2-1 may be started at time point ta, a program operation on block BLK2-2 may be started at time point tb, a program operation on block BLK2-3 may be started at time point tc, and a program operation on block BLK2-4 may be started at time point td. This may be due to a difference in time points at which a program command corresponding to each of the blocks BLK2-1, BLK2-2, BLK2-3 and BLK2-4 is issued from the second queue as described above with reference to FIG. 9.

During the second time interval tPRD2, an erase operation on the block BLK1-2 may be performed, and a program operation on the blocks BLK1-1, BLK2-1, BLK2-2, BLK2-3 and BLK2-4 may be performed.

In some embodiments, the block BLK1-2 may be included in the first super block to perform the erase operation on the block BLK1-2, and the blocks BLK1-1, BLK2-1, BLK2-2, BLK2-3 and BLK2-4 may be included in the second super block to perform the program operation on the blocks BLK1-1, BLK2-1, BLK2-2, BLK2-3 and BLK2-4.

During the third time interval tPRD3, an erase operation on the block BLK1-3 may be performed, and a program operation on the blocks BLK1-1, BLK1-2, BLK2-1, BLK2-2, BLK2-3, and BLK2-4 may be performed.

In some embodiments, the block BLK1-3 may be included in the first super block to perform the erase operation on the block BLK1-3, and the blocks BLK1-1, BLK1-2, BLK2-1, BLK2-2, BLK2-3 and BLK2-4 may be included in the second super block to perform the program operation on the blocks BLK1-1, BLK1-2, BLK2-1, BLK2-2, BLK2-3 and BLK2-4.

In the first to third time intervals tPRD1, tPRD2 and tPRD3, the number of blocks included in the second super block may be different from each other. For example, the number of blocks included in the second super block in the first time period tPRD1 may be four, the number of blocks included in the second super block in the second time interval tPRD2 may be five, and the number of blocks included in the second super block in the third time interval tPRD3 may be six. Thus, as a plurality of time intervals including the first to third time intervals tPRD1, tPRD2 and tPRD3 elapse, the number of blocks included in the second super block may gradually increase.

In FIG. 12A, a program operation may be performed with respect to a block on which the erase operation has been performed in the previous time interval immediately after an erase operation is completed in the present time interval. For example, during the second time interval tPRD2, a program operation may be performed with respect to the block BLK1-1 on which an erase operation is performed in the first time interval tPRD1 immediately after the erase operation is completed. During the third time interval tPRD3, a program operation may be performed with respect to the block BLK1-2 on which an erase operation is performed in the second time interval tPRD2 immediately after the erase operation is completed.

In FIG. 12B, a program operation may be performed with respect to a block on which the erase operation has been performed in the previous time interval immediately after programming on blocks included in the second super block is completed in the previous time interval. For example, during the second time interval tPRD2, a program operation may be performed with respect to the block BLK1-1 on which an erase operation is performed immediately after a program operation on blocks BLK2-1, BLK2-2, BLK2-3 and BLK2-4 included in the second super block is completed. During the third time interval tPRD3, a program operation may be performed with respect to the block BLK1-2 on which an erase operation is performed immediately after a program operation on blocks BLK1-1, BLK2-1, BLK2-2, BLK2-3 and BLK2-4 included in the second super block is completed.

In FIG. 12C, a program operation may be performed last with respect to a block on which an erase operation has been performed in the previous time interval among blocks included in the second super block in the present time interval. For example, the block BLK1-1 on which the erase operation is performed within the first time interval tPRD1 may be programmed last among blocks BLK1-1, BLK2-1, BLK2-2, BLK2-3 and BLK2-4 included in the second super block corresponding to the second time interval tPRD2. The block BLK1-2 on which the erase operation is performed within the second time interval tPRD2 may be programmed last among blocks BLK1-1, BLK1-2, BLK2-1, BLK2-2, BLK2-3 and BLK2-4 included in the second super block corresponding to the third time interval tPRD3.

Based on the above configuration, a time point at which a program operation in the present time interval with respect to a block on which an erase operation is performed within the previous time interval starts may be adjusted.

In some embodiments, a program operation may be started on an erased block at a time point at which a predetermined time has elapsed from a time point at which the erase operation is completed in the previous time interval. For example, in FIG. 12A, a program operation on the block BLK1-1 may be started at a time point t2 at which the second time interval tPRD2 starts, and may be started at a time point t3-1 at which a predetermined time has elapsed from a time point t3 at which the third time interval tPRD3 starts. For example, in FIG. 12B, a program operation on the block 1-1 may be started at a time point t2 at which the second time interval tPRD2 starts, and may be started at a time point t3-2 at which a predetermined time has elapsed from a time point t3-1 at which the third time interval tPRD3 starts. For example, in FIG. 12C, a program operation on the block 1-1 may be started at a time point t2-1 at which a predetermined time has elapsed from a time point t2 at which the second time interval tPRD2 starts, and may be started at a time point t3-3 at which a predetermined time has elapsed from a time point from a time point t3-1 at which the third time interval tPRD3 starts. In this case, a program operation on the block BLK1-2 may be started at a different time point t3-4 at which a predetermined time has elapsed from a time point t3-1 at which the third time interval tPRD3 starts.

Figure 13A:
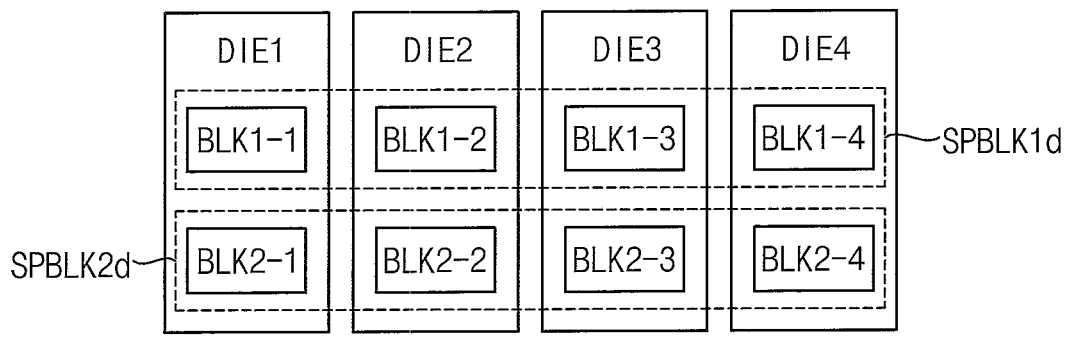
FIGS. 13A, 13B and 13C are diagrams illustrating examples of super blocks corresponding to a plurality of time intervals including the first time interval and the second time interval in FIG. 6.
Figure 13B:
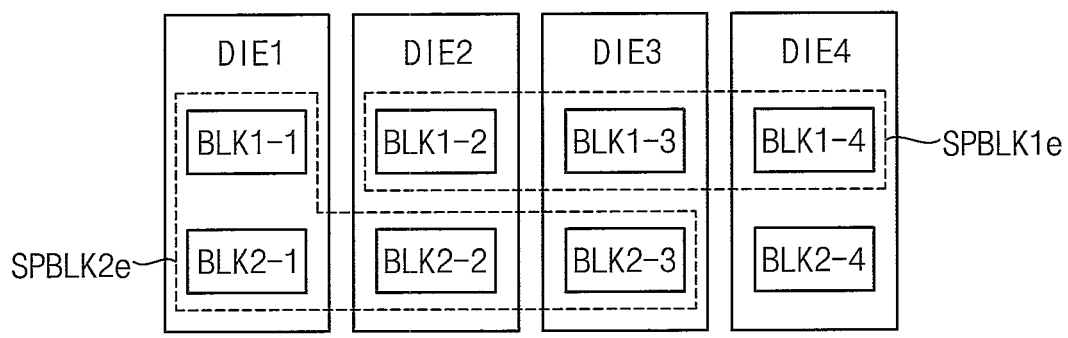
Figure 13C:
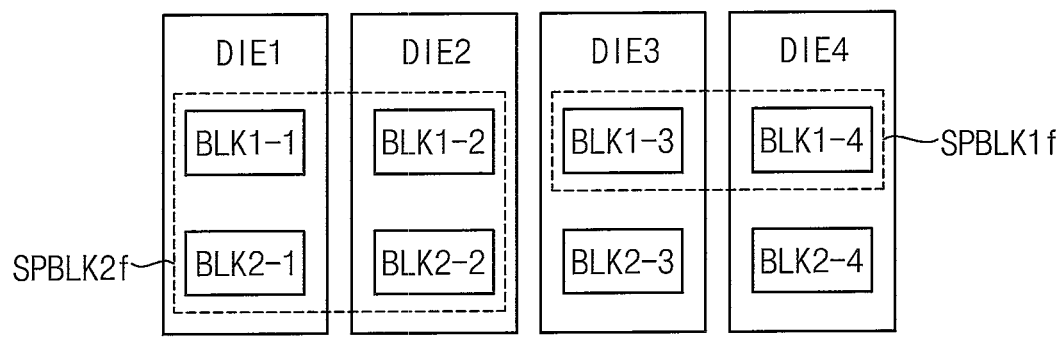

FIGS. 13A, 13B and 13C are diagrams illustrating examples of super blocks corresponding to a plurality of time intervals including the first time interval and the second time interval in FIG. 6.

In FIGS. 13A, 13B and 13C, a plurality of dies DIE1, DIE2, DIE and DIE4 and a plurality of blocks BLK1-1, BLK2-1, BLK1-2, BLK2-2, BLK1-3, BLK2-3, BLK1-4 and BLK2-4 included in the plurality of dies DIE1, DIE2, DIE3 and DIE4 are illustrated.

The first die DIE1 may include blocks BLK1-1 and BLK2-1, the second die DIE2 may include blocks BLK1-2 and BLK2-2, the third die DIE3 may include block BLK1-3 and BLK2-3, and the fourth die DIE4 may include blocks BLK1-4 and BLK2-4.

In FIGS. 13A, 13B and 13C, for convenience of description, only a portion BLK1-1, BLK2-1, BLK1-2, BLK2-2, BLK1-3, BLK2-3, BLK1-4 and BLK2-4 of the plurality of blocks BLK1-1 to BLKN-1, BLK1-2 to BLKN-2, BLK1-3 to BLKN-3, . . . , BLK1-M to BLKN-M illustrated in FIG. 3 are illustrated.

In FIGS. 13A, 13B and 13C, the plurality of blocks BLK1-1, BLK2-1, BLK1-2, BLK2-2, BLK1-3, BLK2-3, BLK1-4 and BLK2-4 may be grouped in first super blocks SPBLK1$d$, SPBLK1$e$ and SPBLK1$f$ and second super blocks SPBLK2$d$, SPBLK2$e$ and SPBLK2$f$.

In some embodiments, the first super block SPBLK1$d$ and the second super block SPBLK2$d$ in FIG. 13A may correspond to a first time interval, the first super block SPBLK1$e$ and the second super block SPBLK2$e$ may correspond to a second time interval after the first time interval, and the first super block SPBLK1$f$ and the second super block SPBLK2$f$ may correspond to a third time interval after the second time interval.

In some embodiments, blocks BLK1-1, BLK1-2, BLK1-3 and BLK1-4 may be grouped in the first super block SPBLK1$d$ corresponding to the first time interval, and blocks BLK2-1, BLK2-2, BLK2-3 and BLK2-4 may be grouped in the second super block SPBLK2$d$ corresponding to the first time interval.

In some embodiments, one or more blocks, e.g., BLK1-1, may be removed from the blocks BLK1-1, BLK1-2, BLK1-3 and BLK1-4 included in the first super block SPBLK1$d$, the remaining blocks BLK1-2, BLK1-3 and BLK1-4 may be grouped in the first super block SPBLK1$e$ corresponding to the second time interval, and the removed block BLK1-1 and blocks BLK2-1, BLK2-2 and BLK2-3 may be grouped in the second super block SPBLK2$e$ corresponding to the second time interval.

In some embodiments, one or more blocks, e.g., BLK1-2, may be removed from the blocks BLK1-2, BLK1-3 and BLK1-4 included in the first super block SPBLK1$e$, the remaining blocks BLK1-3 and BLK1-4 may be grouped in the first super block SPBLK1$f$ corresponding to the third time interval, and the removed block BLK1-2 and blocks BLK1-1, BLK2-1 and BLK2-2 may be grouped in the second super block SPBLK2$f$ corresponding to the third time interval.

As compared to FIGS. 7A, 7B and 7C, in FIGS. 13A, 13B and 13C, one or more blocks included in the second super block corresponding to the previous time interval may be removed from the super block corresponding to the present time interval, and one or more blocks included in the second super block corresponding to the present time interval may be removed from the super block corresponding to the next time interval.

FIG. 14 is a timing diagram illustrating operations of the memory device in FIG. 2.

Referring to FIG. 14, time points t1, t2, t3 and t4 and time intervals tPRD1, tPRD2, tPRD3 between the time points t1, t2, t3 and t4 are illustrated. The time interval tPRD1 may correspond to a first time interval, the time interval tPRD2 may correspond to a second time interval, and the time interval tPRD3 may correspond to a third time interval.

During the first time interval tPRD1, an erase operation may be performed on a block BLK1-1, and a program operation may be performed on blocks BLK2-1, BLK2-2, BLK2-3 and BLK2-4.

During the second time interval tPRD2, an erase operation may be performed on a block BLK1-2, and a program operation may be performed on blocks BLK1-1, BLK2-1, BLK2-2 and BLK2-3.

During the third time interval tPRD3, an erase operation may be performed on a block BLK1-3, and a program operation may be performed on blocks BLK1-1, BLK1-2, BLK2-1 and BLK2-2.

In each of the first to third time intervals tPRD1, tPRD2 and tPRD3, the number of blocks included in the second super block may be the same.

For example, the number of blocks included in the second super block in each of the first time interval tPRD1, tPRD2 and tPRD3 may be four. Thus, as a plurality of time intervals including the first to third time intervals tPRD1, tPRD2 and tPRD3 elapse, the number of blocks included in the second super block may be maintained.

Figure 15:
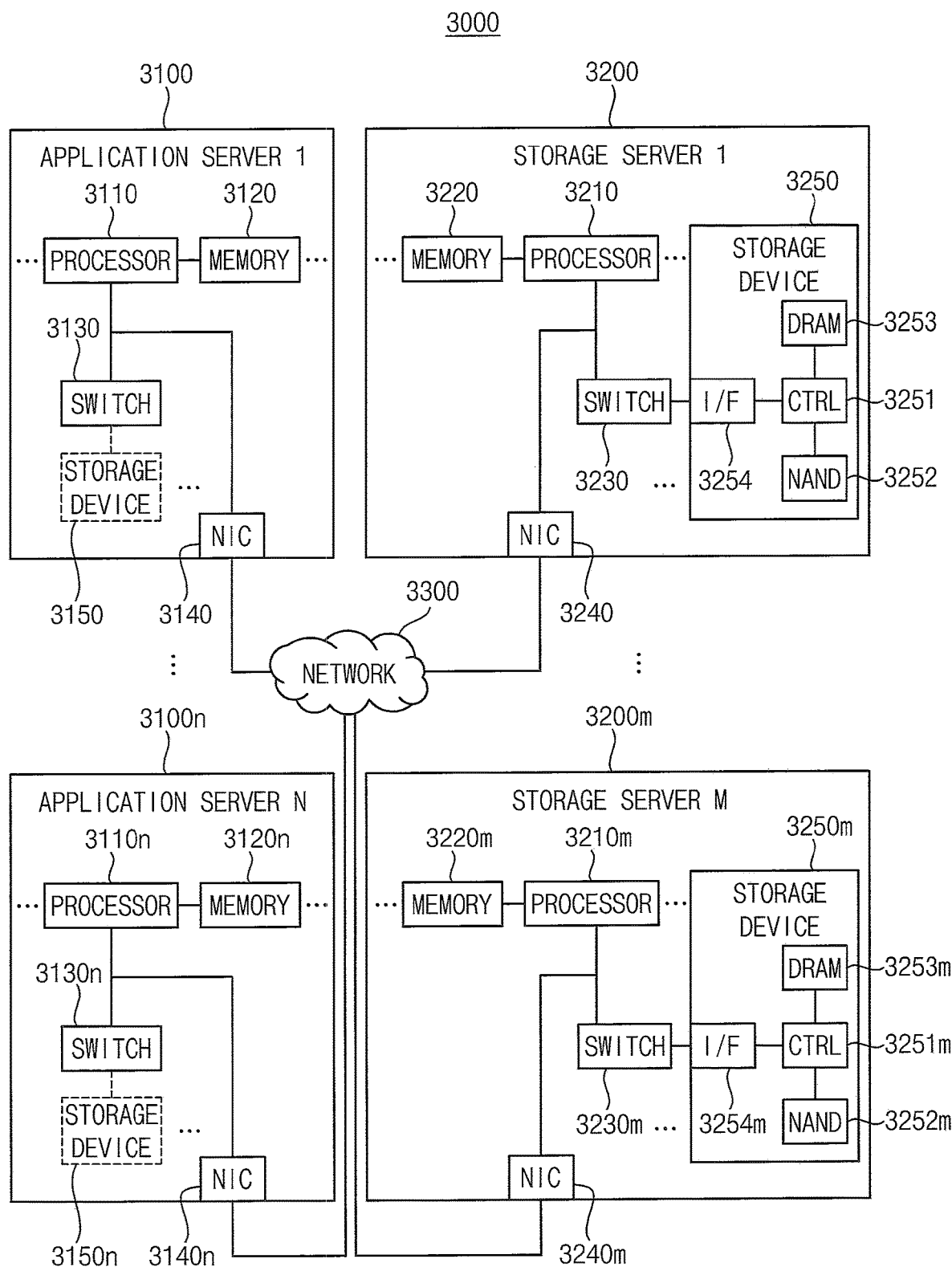
FIG. 15 is a block diagram illustrating a data center to which the memory system according to example embodiments can be applied.

FIG. 15 is a block diagram illustrating a data center to which the memory system according to example embodiments is applied.

Referring to FIG. 15, a data center 3000 may be a facility that collects various types of data and provides various services, and may be referred to as a data storage center. The data center 3000 may be a system for operating search engines and databases, and may be a computing system used by companies such as banks or government agencies. The data center 3000 may include application servers 3100 to 3100n and storage servers 3200 to 3200m. The number of the application servers 3100 to 3100n and the number of the storage servers 3200 to 3200m may be variously selected according to example embodiments, and the number of the application servers 3100 to 3100n and the number of the storage servers 3200 to 3200m may be different from each other.

The application server 3100 may include at least one processor 3110 and at least one memory 3120, and the storage server 3200 may include at least one processor 3210 and at least one memory 3220. An operation of the storage server 3200 will be described as an example. The processor 3210 may control overall operations of the storage server 3200, and may access the memory 3220 to execute instructions and/or data loaded in the memory 3220. The memory 3220 may include at least one of a double data rate (DDR) synchronous dynamic random access memory (SDRAM), a high bandwidth memory (HBM), a hybrid memory cube (HMC), a dual in-line memory module (DIMM), an Optane DIMM, a nonvolatile DIMM (NVDIMM), etc. The number of the processors 3210 and the number of the memories 3220 included in the storage server 3200 may be variously selected according to example embodiments. In some example embodiments, the processor 3210 and the memory 3220 may provide a processor-memory pair. In some example embodiments, the number of the processors 3210 and the number of the memories 3220 may be different from each other. The processor 3210 may include a single core processor or a multiple core processor. The above description of the storage server 3200 may be similarly applied to the application server 3100. The application server 3100 may include at least one storage device 3150, and the storage server 3200 may include at least one storage device 3250. In some example embodiments, the application server 3100 may not include the storage device 3150. The number of the storage devices 3250 included in the storage server 3200 may be variously selected according to example embodiments.

The application servers 3100 to 3100n and the storage servers 3200 to 3200m may communicate with each other through a network 3300. The network 3300 may be implemented using a fiber channel (FC) or an Ethernet. The FC may be a medium used for a relatively high speed data transmission, and an optical switch that provides high performance and/or high availability may be used. The storage servers 3200 to 3200m may be provided as file storages, block storages or object storages according to an access scheme of the network 3300.

In some example embodiments, the network 3300 may be a storage-only network or a network dedicated to a storage such as a storage area network (SAN). For example, the SAN may be an FC-SAN that uses an FC network and is implemented according to an FC protocol (FCP). For another example, the SAN may be an IP-SAN that uses a transmission control protocol/internet protocol (TCP/IP) network and is implemented according to an iSCSI (a SCSI over TCP/IP or an Internet SCSI) protocol. In other example embodiments, the network 3300 may be a general or normal network such as the TCP/IP network. For example, the network 3300 may be implemented according to at least one of protocols such as an FC over Ethernet (FCoE), a network attached storage (NAS), a nonvolatile memory express (NVMe) over Fabrics (NVMe-oF), etc.

Hereinafter, example embodiments will be described based on the application server 3100 and the storage server 3200. The description of the application server 3100 may be applied to the other application server 3100n, and the description of the storage server 3200 may be applied to the other storage server 3200m.

The application server 3100 may store data requested to be stored by a user or a client into one of the storage servers 3200 to 3200m through the network 3300. In addition, the application server 3100 may obtain data requested to be read by the user or the client from one of the storage servers 3200 to 3200m through the network 3300. For example, the application server 3100 may be implemented as a web server or a database management system (DBMS).

The application server 3100 may access a memory 3120n or a storage device 3150n included in the other application server 3100n through the network 3300, and/or may access the memories 3220 to 3220m or the storage devices 3250 to 3250m included in the storage servers 3200 to 3200m through the network 3300. Thus, the application server 3100 may perform various operations on data stored in the application servers 3100 to 3100n and/or the storage servers 3200 to 3200m. For example, the application server 3100 may execute a command for moving or copying data between the application servers 3100 to 3100n and/or the storage servers 3200 to 3200m. The data may be transferred from the storage devices 3250 to 3250m of the storage servers 3200 to 3200m to the memories 3120 to 3120n of the application servers 3100 to 3100n directly or through the memories 3220 to 3220m of the storage servers 3200 to 3200m. For example, the data transferred through the network 3300 may be encrypted data for security or privacy.

In the storage server 3200, an interface 3254 may provide a physical connection between the processor 3210 and a controller 3251 and/or a physical connection between a network interface card (NIC) 3240 and the controller 3251. For example, the interface 3254 may be implemented based on a direct attached storage (DAS) scheme in which the storage device 3250 is directly connected with a dedicated cable. For example, the interface 3254 may be implemented based on at least one of various interface schemes such as an advanced technology attachment (ATA), a serial ATA (SATA) an external SATA (e-SATA), a small computer system interface (SCSI), a serial attached SCSI (SAS), a peripheral component interconnection (PCI), a PCI express (PCIe), an NVMe, an IEEE 1394, a universal serial bus (USB), a secure digital (SD) card interface, a multi-media card (MMC) interface, an embedded MMC (eMMC) interface, a universal flash storage (UFS) interface, an embedded UFS (eUFS) interface, a compact flash (CF) card interface, etc.

The storage server 3200 may further include a switch 3230 and the NIC 3240. The switch 3230 may selectively connect the processor 3210 with the storage device 3250 or may selectively connect the NIC 3240 with the storage device 3250 under a control of the processor 3210. Similarly, the application server 3100 may further include a switch 3130 and an NIC 3140.

In some example embodiments, the NIC 3240 may include a network interface card, a network adapter, or the like. The NIC 3240 may be connected to the network 3300 through a wired interface, a wireless interface, a Bluetooth interface, an optical interface, or the like. The NIC 3240 may further include an internal memory, a digital signal processor (DSP), a host bus interface, or the like, and may be connected to the processor 3210 and/or the switch 3230 through the host bus interface. The host bus interface may be implemented as one of the above-described examples of the interface 3254. In some example embodiments, the NIC 3240 may be integrated with at least one of the processor 3210, the switch 3230 and the storage device 3250.

In the storage servers 3200 to 3200$m$ and/or the application servers 3100 to 3100$n$, the processor may transmit a command to the storage devices 3150 to 3150$n$ and 3250 to 3250$m$ or the memories 3120 to 3120$n$ and 3220 to 3220$m$ to program or read data. For example, the data may be error-corrected data by an error correction code (ECC) engine. For example, the data may be processed by a data bus inversion (DBI) or a data masking (DM), and may include a cyclic redundancy code (CRC) information. For example, the data may be encrypted data for security or privacy.

The storage devices 3150 to 3150$n$ and 3250 to 3250$m$ may transmit a control signal and command/address signals to NAND flash memory devices 3252 to 3252$m$ in response to a read command received from the processor. When data is read from the NAND flash memory devices 3252 to 3252$m$, a read enable (RE) signal may be input as a data output control signal and may serve to output data to a DQ bus. A data strobe signal (DQS) may be generated using the RE signal. The command and address signals may be latched in a page buffer based on a rising edge or a falling edge of a write enable (WE) signal.

The controller 3251 may control overall operations of the storage device 3250. In some example embodiments, the controller 3251 may include a static random access memory (SRAM). The controller 3251 may write data into the NAND flash memory device 3252 in response to a write command, or may read data from the NAND flash memory device 3252 in response to a read command. For example, the write command and/or the read command may be provided from the processor 3210 in the storage server 3200, the processor 3210$m$ in the other storage server 3200$m$, or the processors 3110 to 3110$n$ in the application servers 3100 to 3100$n$. A DRAM 3253 may temporarily store (e.g., may buffer) data to be written to the NAND flash memory device 3252 or data read from the NAND flash memory device 3252. Further, the DRAM 3253 may store meta data. The meta data may be data generated by the controller 3251 to manage user data or the NAND flash memory device 3252. The storage devices 3150 to 3150$n$ and 3250 to 3250$m$ may be implemented based on the memory system according to example embodiments described above with reference to FIGS. 1 to 15, and each of the storage devices 3150 to 3150$n$ and 3250 to 3250$m$ may perform the method of operating the memory system according to example embodiments.

As described above, in the method of operation the memory system according to example embodiments including the above configurations, an erase operation on blocks included in the first super block and a program operation on blocks included in the second super block may be simultaneously performed in parallel in each of the plurality of time intervals. The program operation corresponding to the program request or the program command may be efficiently performed without delay due to the completion of the erase operation. The blocks on which the erase operation has been performed may be grouped in the second super block in a next time period that follows the erase operation, and during the next time interval, a program operation may be performed on blocks on which the erase operation has been performed. Thus, it is possible to avoid the EPI constraint that a memory cell on which the erase operation has been performed must be programmed within a predetermined time after being erased. The first super block and the second super block may group a plurality of blocks included in the memory device in various schemes. Based on a change in configuration of super blocks according to the grouping, time intervals and storage regions required for programming data may be adjusted in various schemes.

The inventive concept may be applied to various electronic devices and systems that include the memory devices and the memory systems. For example, the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of example embodiments and is not to be construed as limiting thereof. Although some example embodiments have been described, those skilled in the art will readily appreciate that many modifications are possible in the example embodiments without materially departing from the teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of operating a memory system comprising a memory controller and a memory device, the memory device comprising a plurality of dies each of which includes a plurality of blocks, the method comprising:
   executing, by at least one of the memory controller or the memory device, operations comprising:
   outputting a plurality of commands comprising first and second commands based on a program request and program data, wherein the plurality of commands are configured to control the memory device in units of super blocks, the super blocks comprising blocks included in different dies of the plurality of dies;
   during a first time interval, performing, based on the first commands, a first erase operation on a first-first block among the first-first block to a first-Mth block of the blocks included in a first super block among the super blocks, where M is an integer greater than or equal to two;
   during the first time interval, performing, based on the first commands, a first program operation on a second-first block to a second-Mth block of the blocks included in a second super block among the super blocks;

during a second time interval after the first time interval, performing, based on the second commands, a second erase operation on a first-second block among the first-first block to the first-Mth block;

during the second time interval, performing, based on the second commands, a second program operation on the first-first block and one or more blocks among the second-first block to the second-Mth block; and during each time interval from among a plurality of consecutive time intervals that are after the second time interval, performing an additional respective erase operation on at least one of the blocks included in the first super block and, while performing the additional respective erase operation, performing an additional respective program operation on at least one of the blocks included in the second super block, wherein no intervening time intervals are present between each consecutive pair of the plurality of consecutive time intervals, and wherein the first time interval is equal to an amount time required to complete the first erase operation and complete the first program operation, wherein the second time interval is equal to an amount time required to complete the second erase operation and is less than an amount of time required to complete the second program operation, and wherein each of the plurality of consecutive time intervals is equal to an amount of time required to complete the additional respective erase operation and is less than an amount of time required to complete the additional respective program operation on each of the at least one of the blocks included in the second super block.

2. The method of claim 1, wherein:
during the first time interval, the first-first block to the first-Mth block are grouped in the first super block, and the second-first block to the second-Mth block are grouped in the second super block, and during the second time interval, the first-second block to the first-Mth block are grouped in the first super block, and the first-first block and the one or more blocks among the second-first block to the second-Mth block are grouped in the second super block.

3. The method of claim 2, wherein:
during the second time interval, one or more of the blocks among the second-first block to the second-Mth block are not included in the second super block.

4. The method of claim 1, further comprising:
during a third time interval from among the plurality of consecutive time intervals, performing, based on third commands of the plurality of commands, a third erase operation on a first-third block among the first-first block to the first-Mth block; and during the third time interval, performing, based on the third commands, a third program operation on the first-first block, the first-second block, and one or more blocks among the second-first block to the second-Mth block.

5. The method of claim 4, wherein:
during the third time interval, the first-third block to the first-Mth block are grouped in the first super block, and the first-first block, the first-second block, and the one or more blocks among the second-first block to the second-Mth block are grouped in the second super block.

6. The method of claim 5, wherein:
during the third time interval, two or more blocks among the second-first block to the second-Mth block are not included in the second super block.

7. The method of claim 1, wherein outputting the plurality of commands comprises:
generating program scheduling information representing the blocks to be grouped in the first super block and the second super block among the plurality of blocks during each of the first time interval and the second time interval; and generating the plurality of commands based on the program scheduling information.

8. The method of claim 7, wherein generating the program scheduling information comprises:
determining the first time interval and the second time interval based on a size of the program data and a number of bits of first data that is stored in each of a plurality of memory cells included in the plurality of blocks; and determining the first super block and the second super block based on the size of the program data, the number of bits of the first data, the first time interval, and the second time interval.

9. The method of claim 8, wherein generating the plurality of commands comprises:
storing commands corresponding to the first super block among the plurality of commands in a first command queue among a plurality of command queues; and storing commands corresponding to the second super block among the plurality of commands in a second command queue among the plurality of command queues.

10. The method of claim 1, wherein performing the second program operation comprises:
based on the second commands, at a first time point at which a predetermined time has elapsed from a second time point, initiating the second program operation on the first-first block, wherein the second time point represents a time point at which the first erase operation on the first-first block is completed within the first time interval.

11. The method of claim 1, wherein, during the second time interval, the second commands are output sequentially with respect to the blocks included in the second super block.

12. The method of claim 1, wherein the first super block includes invalid blocks.

13. The method of claim 1, wherein outputting the plurality of commands comprises:
generating program scheduling information representing the blocks to be grouped in the first super block and the second super block among the plurality of blocks during each of the first time interval and the second time interval; and generating the plurality of commands based on the program scheduling information, wherein the program scheduling information further represents a time point at which each of the second commands is issued to the memory device.

14. A memory system comprising:
a memory device comprising a plurality of dies, each of which includes a plurality of blocks; and a memory controller configured to control the memory device, wherein the memory controller is configured to output a plurality of commands comprising first and second commands based on a program request and program data, the plurality of commands are configured to control the memory device in units of super blocks, and the super blocks comprise blocks included in different dies of the plurality of dies, wherein the memory device is configured to:
during a first time interval, perform, based on the first commands, a first erase operation on a first-first block among the first-first block to a first-Mth block of the blocks included in a first super block among the super blocks, where M is an integer greater than or equal to two;
during the first time interval and while performing the first erase operation on the first-first block, perform, based on the first commands, a first program operation on a second-first block to a second-Mth block of the blocks included in a second super block among the super blocks;
during a second time interval after the first time interval, perform, based on the second commands, a second erase operation on a first-second block among the first-first block to the first-Mth block;
during the second time interval and while performing the second erase operation on the first-second block, perform, based on the second commands, a second program operation on the first-first block and one or more blocks among the second-first block to the second-Mth block; and
during each time interval from among a plurality of consecutive time intervals that are after the second time interval, perform an additional respective erase operation on at least one of the blocks included in the first super block and, while performing the additional respective erase operation, perform an additional respective program operation on at least one of the blocks included in the second super block,
wherein no intervening time intervals are present between each consecutive pair of the plurality of consecutive time intervals, and
wherein the first time interval is equal to an amount time required to complete the first erase operation and the first program operation,
wherein the second time interval is equal to an amount time required to complete the second erase operation and is less than an amount of time required to complete the second program operation, and
wherein each of the plurality of consecutive time intervals is equal to an amount of time required to perform the additional respective erase operation and is less than an amount of time required to complete the additional respective program operation.

15. The memory system of claim 14, wherein:
during the first time interval, the first-first block to the first-Mth block are grouped in the first super block, and the second-first block to the second-Mth block are grouped in the second super block, and
during the second time interval, the first-second block to the first-Mth block are grouped in the first super block, and the first-first block and the one or more blocks among the second-first block to the second-Mth block are grouped in the second super block.

16. The memory system of claim 14, wherein the memory device is configured to:
during a third time interval from among the plurality of consecutive time intervals, perform, based on third commands of the plurality of commands, a third erase operation on a first-third block among the first-first block to the first-Mth block, and
during the third time interval, perform, based on the third commands, perform a third program operation on the first-first block, the first-second block, and one or more blocks among the second-first block to the second-Mth block.

17. The memory system of claim 16, wherein:
during the third time interval, the first-third block to the first-Mth block are grouped in the first super block, and the first-first block, the first-second block, and the one or more blocks among the second-first block to the second-Mth block are grouped in the second super block.

18. The memory system of claim 14, wherein:
the plurality of dies of the memory device comprises a first die to a Mth die,
the first super block corresponding to the first time interval includes the first-first block to the first-Mth block, which are a first portion of the plurality of blocks included in the first die to the Mth die, and
the second super block corresponding to the second time interval includes the second-first block to the second-Mth block, which are a second portion of the plurality of blocks included in the first die to the Mth die.

19. The memory system of claim 14, wherein the memory device is configured to:
during a third time interval from among the plurality of consecutive time intervals, perform, based on third commands of the plurality of commands, a third erase operation on a first-third block among the first-first block to the first-Mth block,
during the third time interval, perform, based on the third commands, perform a third program operation on the first-first block, the first-second block, and one or more blocks among the second-first block to the second-Mth block, and
during the third time interval, the first-third block to the first-Mth block are grouped in the first super block, and the first-first block, the first-second block, and the one or more blocks among the second-first block to the second-Mth block are grouped in the second super block,
wherein the first super block includes invalid blocks.

20. A method of operating a memory system comprising a memory controller and a memory device, the method comprising:
executing, by at least one of the memory controller or the memory device, operations comprising:
outputting a plurality of commands comprising first and second commands based on a program request and program data, wherein the first and second commands are configured to control the memory device in units of super blocks, the super blocks comprising blocks included in different dies of the memory device;
during a first time interval, performing, based on the first commands, a first erase operation on a first-first block among the first-first block to a first-Mth block of the blocks included in a first super block among the super blocks, where M is an integer greater than or equal to two;
during the first time interval, performing, based on the first commands, a first program operation on a second-first block to a second-Mth block of the blocks included in a second super block among the super blocks;
during a second time interval after the first time interval, performing, based on the second commands, a second erase operation on a first-second block among the first-first block to the first-Mth block; and during the second time interval, performing, based on the second commands, a second program operation on the first-first block and one or more blocks among the second-first block to the second-Mth block; and during a third time interval after the second time interval, performing, based on third commands of the plurality of commands, a third erase operation on a first-third block among the first-first block to the first-Mth block and performing a third program operation on the first-first block, the first-second block, and one or more blocks among the second-first block to the second-Mth block, wherein:

during the first time interval, the first-first block to the first-Mth block are grouped in the first super block, and the second-first block to the second-Mth block are grouped in the second super block, and during the second time interval and after performing the first erase operation on the first-first block, the first-second block to the first-Mth block are grouped in the first super block, and the first-first block and the one or more blocks among the second-first block to the second-Mth block are grouped in the second super block, during the third time interval and after performing the second erase operation on the first-second block, the first-first block, the first-second block, and the one or more blocks among the second-first block to the second-Mth block are grouped in the second super block, wherein outputting the first and second commands comprises:

generating program scheduling information representing the blocks to be grouped in the first super block and the second super block during each of the first time interval and the second time interval; and generating the first and second commands based on the program scheduling information, wherein during each time interval from among a plurality of consecutive time intervals that are after the third time interval, performing an additional respective erase operation on at least one of the blocks included in the first super block and, while performing the additional respective erase operation, performing an additional respective program operation on at least one of the blocks included in the second super block, wherein no intervening time intervals are present between each consecutive pair of the plurality of consecutive time intervals, wherein the first time interval is equal to an amount time required to complete the first erase operation and complete the first program operation, wherein the second time interval is equal to an amount time required to complete the second erase operation and is less than an amount of time required to complete the second program operation, wherein the third time interval is equal to an amount time required to complete the third erase operation and is less than an amount of time required to complete the third program operation, and wherein each of the plurality of consecutive time intervals is equal to an amount of time required to perform the additional respective erase operation and is less than an amount of time required to complete the additional respective program operation.

* * * * *